(12) United States Patent
Kumagai et al.

(10) Patent No.: US 12,731,715 B2
(45) Date of Patent: Sep. 8, 2026

(54) COIL DEVICE AND POWER CONVERSION DEVICE

(71) Applicants: Mitsubishi Electric Corporation, Tokyo (JP); Nunome Electric Co., Ltd., Nagoya (JP)

(72) Inventors: Takashi Kumagai, Tokyo (JP); Kazuaki Fukui, Tokyo (JP); Yoshiaki Yamamoto, Tokyo (JP); Kazufumi Tanaka, Tokyo (JP); Kenji Asai, Nagoya (JP); Kazuya Ohashi, Nagoya (JP); Koji Ishihara, Nagoya (JP)

(73) Assignees: Mitsubishi Electric Corporation, Tokyo (JP); Nunome Electric Co., Ltd., Nagoya (JP)

( * ) Notice: Subject to any disclaimer, the term of this patent is extended or adjusted under 35 U.S.C. 154(b) by 627 days.

(21) Appl. No.: 18/260,943

(22) PCT Filed: Feb. 2, 2022

(86) PCT No.: PCT/JP2022/004015
§ 371 (c)(1),
(2) Date: Jul. 11, 2023

(87) PCT Pub. No.: WO2022/168857
PCT Pub. Date: Aug. 11, 2022

(65) Prior Publication Data

US 2024/0055171 A1 Feb. 15, 2024

(30) Foreign Application Priority Data

Feb. 4, 2021 (JP) ................................. 2021-016736

(51) Int. Cl.
*H01F 27/08* (2006.01)
*H01F 27/24* (2006.01)
(Continued)

(52) U.S. Cl.
CPC ............ *H01F 27/08* (2013.01); *H01F 27/24* (2013.01); *H01F 27/2823* (2013.01); *H02M 3/335* (2013.01); *H02M 7/537* (2013.01)

(58) Field of Classification Search
CPC ...... H01F 27/08; H01F 27/24; H01F 27/2823; H02M 3/335; H02M 7/537
See application file for complete search history.

(56) References Cited

U.S. PATENT DOCUMENTS

2014/0132380 A1* 5/2014 Jacobson ................ H01F 27/24 29/605
2020/0286668 A1 9/2020 Ishibashi et al.

FOREIGN PATENT DOCUMENTS

CN 203659572 U * 6/2014
JP 57140720 U * 8/1982
(Continued)

OTHER PUBLICATIONS

Notice of Reasons for Refusal dated Sep. 24, 2024, issued in the corresponding Japanese Patent Application No. 2022-579572, 11 pages including 6 pages of English Translation.
(Continued)

*Primary Examiner* — Malcolm Barnes
(74) *Attorney, Agent, or Firm* — Buchanan Ingersoll & Rooney PC

(57) ABSTRACT

A transformer includes a core group and a winding group. Each of a plurality of winding layers penetrates through a plurality of closed magnetic circuits formed by a plurality of cores. When viewed from the top, the cores are disposed with spacing along conductor wires through which current of the winding layers flows, and the winding layers are disposed side by side from the inside to the outside with spacing along a direction intersecting the direction of current. With this configuration, a coil device with good heat
(Continued)

dissipation performance, compact size, high efficiency, and low costs can be provided.

17 Claims, 17 Drawing Sheets

(51) Int. Cl.

| | |
|---|---|
| ***H01F 27/28*** | (2006.01) |
| ***H02M 3/33*** | (2006.01) |
| ***H02M 3/335*** | (2006.01) |
| ***H02M 7/53*** | (2006.01) |
| ***H02M 7/537*** | (2006.01) |

(56) References Cited

FOREIGN PATENT DOCUMENTS

| | | | | | |
|---|---|---|---|---|---|
| JP | S57140720 | A | | 8/1982 | |
| JP | S5940512 | A | * | 3/1984 | |
| JP | 59193011 | A | * | 11/1984 | |
| JP | S59193011 | A | | 11/1984 | |
| JP | H07-335447 | A | | 12/1995 | |
| JP | H0864426 | A | * | 3/1996 | |
| JP | H11-191962 | A | | 7/1999 | |
| JP | 2010050272 | A | | 3/2010 | |
| JP | 2011138931 | A | | 7/2011 | |
| JP | 2015535657 | A | | 12/2015 | |
| JP | 6329558 | B2 | | 4/2018 | |
| JP | 2018190920 | A | * | 11/2018 | |
| WO | 2014077976 | A1 | | 5/2014 | |
| WO | WO-2019073650 | A1 | * | 4/2019 | ............. H01F 30/10 |

OTHER PUBLICATIONS

International Search Report (PCT/ISA/210) with translation and Written Opinion (PCT/ISA/237) mailed on May 10, 2022 by the Japanese Patent Office as the International Searching Authority for International Application No. PCT/JP2022/004015. (9 pages).

Decision of Refusal dated Mar. 4, 2025, issued in the corresponding Japanese Patent Application No. 2022-579572, 8 pages including 4 pages of English Translation.

First Office Action dated Apr. 19, 2026, issued in the corresponding Chinese Patent Application No. 202280012127.8, 27 pages including 13 pages of English Translation.

* cited by examiner 106
106
110
110
110
103c
103b
103
103a
110c
110c
110c
102a
102b
102c
102d
102e
102f
102g
102

Figure 19:
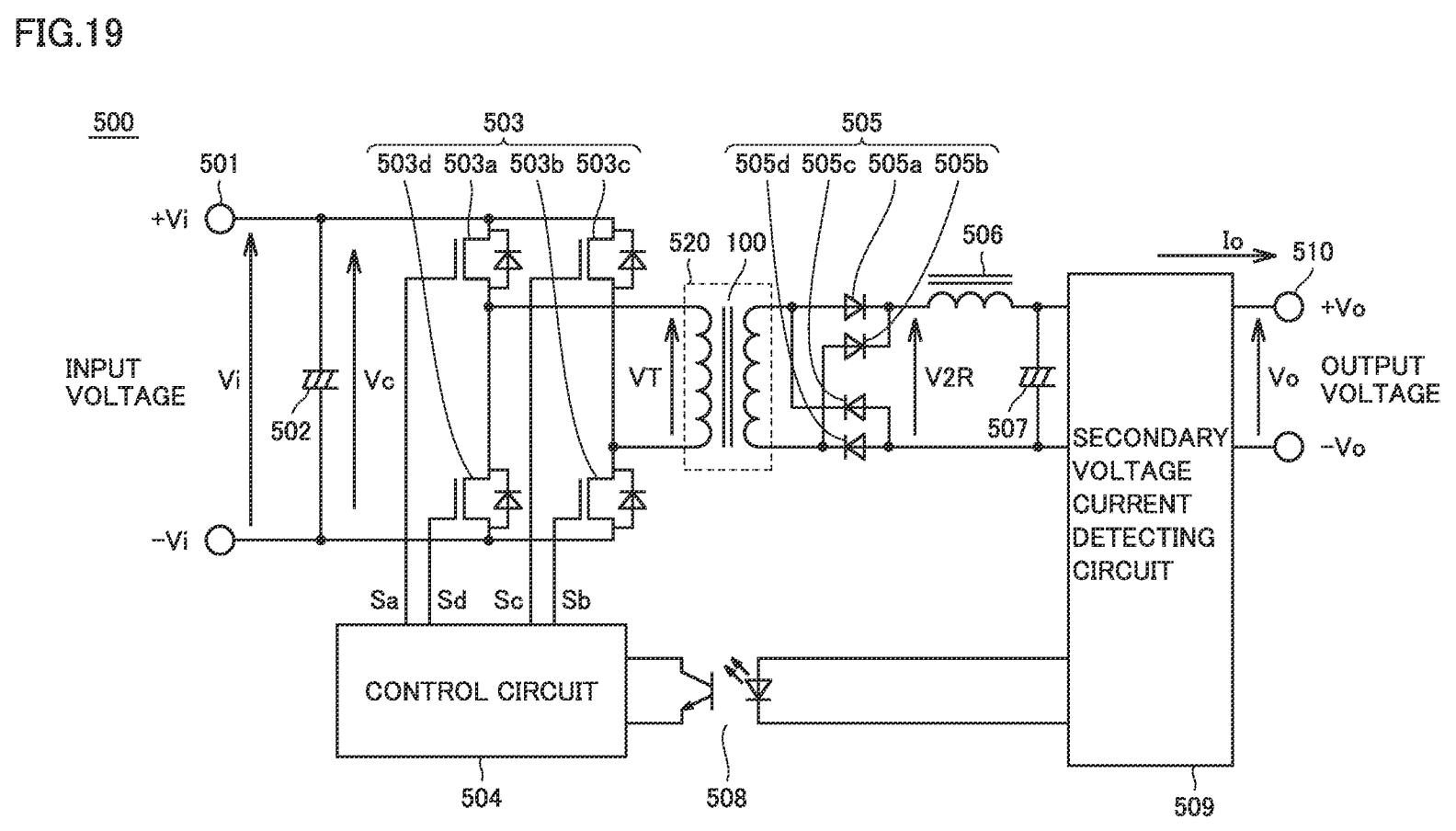

INPUT VOLTAGE
+Vi
501
Vi
-Vi
502
Vc
503
503a
503b
503c
503d
Sa
Sb
Sc
Sd
CONTROL CIRCUIT
504
VT
520
100
505
505a
505b
505c
505d
V2R
506
507
508
SECONDARY VOLTAGE CURRENT DETECTING CIRCUIT
509
Io
Vo
510
+Vo
-Vo
OUTPUT VOLTAGE

WITH SPACE BETWEEN CORES

WITHOUT SPACE BETWEEN CORES (SINGLE CORE)

c1/c2=2 c1/c2=1 c1/c2=0.5

SURFACE AREA SIGNIFICANTLY INCREASES RELATIVE TO NO SPACE BETWEEN CORES WHEN NUMBER OF CORES IS CROSS SECTION RATIO (c1/c2)×10 OR LESS

COIL DEVICE AND POWER CONVERSION DEVICE

TECHNICAL FIELD

The present disclosure relates to a coil device and a power conversion device.

BACKGROUND ART

Conventionally, heat dissipation by air cooling or liquid cooling is performed in coil devices such as transformers and reactors for use in power conversion.

Japanese Patent Laying-Open No. 2010-50272 (PTL 1) discloses a coil device having a structure in which a plurality of cores are disposed such that two E-shaped cores face each other with a gap between the cores to facilitate heat dissipation.

Such coil devices are mainly used for industrial high frequency inverters and power conversion devices. It is desired to use the coil devices in combination with natural air cooling which is the simplest cooling method or forced air cooling.

CITATION LIST

Patent Literature

PTL 1: Japanese Patent Laying-Open No. 2010-50272

SUMMARY OF INVENTION

Technical Problem

In the core arrangement method of the coil device disclosed in Japanese Patent Laying-Open No. 2010-50272, a bobbin is used between the winding and the core. A part of the surface area of the core is therefore a portion fitted to the bobbin. Since there is no gap at the section where the core and the bobbin are fitted, the heat dissipation area in which the core dissipates heat into the air is limited. Moreover, the center of the core is surrounded by the bobbin and the winding, and the temperature of the core tends to increase by heat from the winding. Based on the above, this coil device has room for improvement in cooling performance of the core.

Moreover, magnetic flux is concentrated on some of the cores due to variations in relative permeability of cores, temperature change, and change over time, because each of the cores disposed in parallel has no gap for a magnetic circuit.

In addition, in a state in which the cores are fitted, the winding is disposed in the inside of the magnetic circuit, and most of the surface area of the winding does not contribute to heat dissipation to the air. Thus, this coil device is inferior in cooling performance of the winding.

In addition, this coil device is not such a structure that allows an air flow to effectively flow through the cores when air is supplied. Thus, a plurality of cooling fans or ducts having a complicated structure are separately required for cooling with cooling air. This increases the entire size of the coil device.

An object of the present disclosure is to provide a coil device in a simple structure and with good heat dissipation performance, compact size, high efficiency, and low costs.

Solution to Problem

The present disclosure relates to a coil device. The coil device includes a core group including a plurality of cores forming a plurality of closed magnetic circuits, and a winding group including a plurality of winding layers. Each of the winding layers penetrates through the closed magnetic circuits. When viewed from a first direction, the cores are disposed side by side with spacing along conductor wires through which current of the winding layers flows. When viewed from the first direction, the winding layers are disposed side by side from inside to outside with spacing along a direction intersecting the direction of current.

Advantageous Effects of Invention

In the coil device of the present disclosure, the coil device with good heat dissipation performance, high efficiency, and low costs can be implemented in a simple structure and can be downsized.

BRIEF DESCRIPTION OF DRAWINGS

FIG. 19 is a circuit diagram of a power conversion device in the first embodiment.

DESCRIPTION OF EMBODIMENTS

Figure 1:
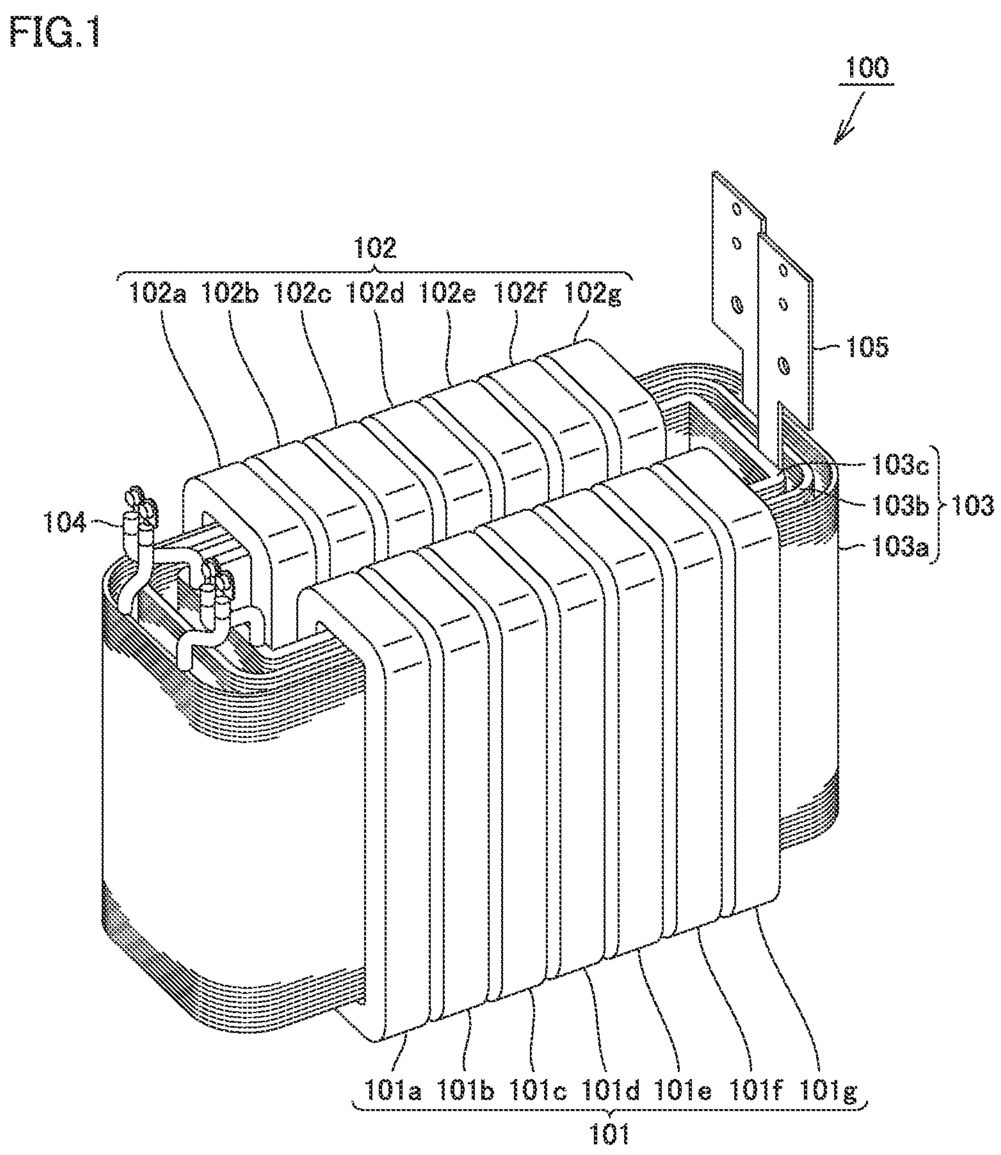
FIG. 1 is a perspective view showing a configuration of a coil device in a first embodiment.

Embodiments will be described in detail below with reference to the drawings. Like or corresponding parts in the drawings are denoted by like reference signs and a description thereof will basically not be repeated.

First Embodiment

FIG. 1 is a perspective view showing a configuration of a coil device in a first embodiment. FIG. 1 shows a configuration of a high frequency transformer 100 for use in power conversion or the like, as an example of the coil device.

First of all, a basic configuration based on an electromagnetic circuit in the first embodiment will be described. Transformer 100 includes core groups 101, 102 and a winding group 103.

Core group 101 is a core assembly in which a plurality of cores 101*a* to 101*g* each having an independent annular closed magnetic circuit are disposed such that the magnetic circuits are in parallel. In the first embodiment, ferrite cores are used as cores 101*a* to 101*g*. Core group 102 and cores 102*a* to 102*g* are similar to core group 101 and cores 101*a* to 101*g*. The detail of the configuration of each core will be described later.

Winding group 103 includes a first winding layer 103*a*, a second winding layer 103*b*, and a third winding layer 103*c* formed by winding conductor wires into a tubular shape. Winding group 103 is a winding assembly including three winding layers.

First winding layer 103*a*, second winding layer 103*b*, and third winding layer 103*c* are held and fixed by several rod-shaped structural members (not shown) sandwiched between the winding layers. The fixing structure for these winding layers is a common fixing structure of transformer windings and is not elaborated here. The holding and fixing of the spacing between first winding layer 103*a* and core groups 101, 102, as well as the holding and fixing of the spacing between third winding layer 103*c* and core groups 101, 102 is similar to that between the winding layers.

First winding layer 103*a* and third winding layer 103*c* are electrically connected in parallel or in series to form a primary winding of transformer 100. Second winding layer 103*b* forms a secondary winding of transformer 100. As shown in FIG. 1, winding group 103 has a triple-layer configuration.

That is, first winding layer 103*a* forming the primary winding is disposed with spacing on the outer periphery side of second winding layer 103*b* forming the secondary winding, and third winding layer 103*c* forming the primary winding is disposed with spacing on the inner periphery side of second winding layer 103*b*. Winding group 103 has a sandwich structure in which second winding layer 103*b* is disposed between first winding layer 103*a* and third winding layer 103*c*.

The spacing between winding layers 103*a*, 103*b*, 103*c* can ensure insulation between the primary winding and the secondary winding. That is, the sandwich structure can be expected to lead to higher withstand voltage because of the improved insulation performance between the primary winding and the secondary winding. Furthermore, since winding group 103 has a sandwich structure in which the secondary winding is sandwiched between the primary windings, flux leakage of the primary winding and the secondary winding can be reduced and deterioration in magnetic coupling caused by the spacing can be suppressed.

The sandwich structure can be expected to lead to higher efficiency because of electromagnetic coupling being kept, higher frequencies and higher efficiency because of reduction of floating capacitance between the winding layers, and downsizing because of improved cooling performance of the winding layers.

Furthermore, since the winding group is constituted with a plurality of winding layers spaced apart from each other, the winding is divided into a plurality of winding layers, and consequently, the thickness of one winding layer is reduced, thereby reducing copper loss due to the skin effect and achieving higher efficiency.

Although an example of the winding arrangement in which the secondary winding is sandwiched between the primary windings has been illustrated in the first embodiment, embodiments are not limited to this arrangement. For example, the winding group may be configured such that the primary winding is sandwiched between the secondary windings, or may be configured such that the primary winding and the secondary winding are each constituted with a plurality of winding layers, which are alternately disposed with spacing.

A primary input terminal 104 is connected to a conductor end of first winding layer 103*a* and a conductor end of third winding layer 103*c*. A secondary output terminal 105 is connected to a conductor end of second winding layer 103*b*. The connection between these terminals and the conductor ends are usually made by a common method such as brazing, welding, and screw fastening, and a description thereof is omitted here.

As shown in FIG. 1, seven cores 101*a* to 101*g* each having an independent annular closed magnetic circuit that constitute core group 101 are aligned with spacing in a direction intersecting a magnetic circuit, preferably the vertical direction. In the first embodiment, since transformer 100 is cooled by air cooling, it is preferable that the distance between adjacent cores is 10 mm or more, irrespective of the size of the core, in the case of air cooling by natural convection. This can reduce the influence of the viscosity of the air and produce an air convection between the cores. In the case of forced air cooling, the distance between cores may be smaller than 10 mm.

Core group 102 is also constituted with seven cores 102*a* to 102*g* aligned in the same manner as core group 101.

Core group 101 and core group 102 are disposed in two rows with spacing from each other. Thus, the cores that constitute a total of 14 magnetic circuits are disposed in a matrix. Each of 14 cores 101*a* to 101*g*, 102*a* to 102*g* is constituted with a plurality of core pieces.

Figure 2:
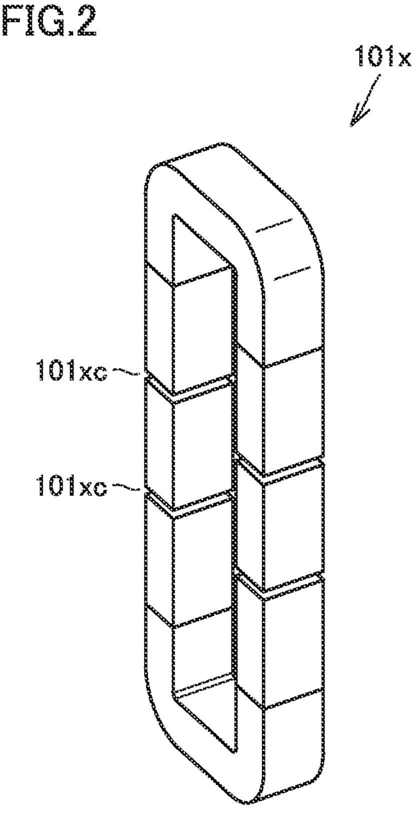
FIG. 2 is a perspective view showing a configuration of one core.
Figure 3:
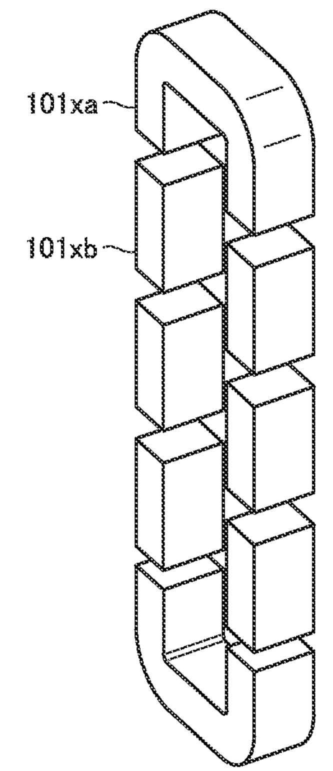
FIG. 3 is a perspective view showing the core in FIG. 2 broken into core pieces.

FIG. 2 is a perspective view showing a configuration of one core. FIG. 3 is a perspective view showing the core in FIG. 2 broken into core pieces. FIG. 2 representatively shows each individual core of cores 101*a* to 101*g*, 102*a* to 102*g* as a core 101*x*.

Core 101*x* includes two U-shaped core pieces 101*xa* and six I-shaped core pieces 101*xb*. Ferrite cores used in high frequency transformers are produced by firing, and it is known that small ones require a shorter firing time and are stable in characteristics with reduced loss. Each of cores 101*a* to 101*g* is constituted with a plurality of core pieces 101*xa* and 101*xb* with a long side of approximately 150 mm or less. The long side of 150 mm is the maximum size of a ferrite piece that can be produced by firing. In transformer 100 in the first embodiment, core group 101 and core group 102 are arranged in two rows and each core includes a number of core pieces to form a magnetic circuit. Thus, the procurement is easier than using large-size ferrite cores, and a magnetic circuit with low loss can be formed with low costs, thereby achieving higher efficiency of high frequency transformers.

In a state in which a magnetic circuit is finally formed, a plurality of core gaps 101*xc* are inserted into the magnetic circuit. Core gap 101*xc* is a non-magnetic region that splits the magnetic circuit. If the thickness of core gap 101*xc* in the magnetic flux direction is large, flux leakage increases and the characteristics of the transformer deteriorates. A rough dimension of core gap 101*xc* in the magnetic flux direction is preferably 5% or less of the long side among four sides of the magnetic circuit cross section of the core.

The core gap used in core gap 101*xc* may be the air but usually formed with a core gap member interposed in consideration of structural fixing. Since magnetic flux passes, the core gap member is preferably non-magnetic with a low electrical conductivity, and nonmetal is used.

Core 101*x* is constituted with eight core pieces 101*xb* and therefore core gaps can be provided at eight sections. In the first embodiment, among the eight sections, core gaps are provided at four sections that are completely covered with the winding group at the core central portion so that loss caused by flux leakage is reduced.

Ferrite with low loss at high frequencies is used as the material of the cores. However, the relative permeability of ferrite is usually approximately 2000 to 6000, the relative permeability varies greatly in the manufacturing process, and the relative permeability significantly changes with temperature during use. When the magnetic circuit of core group 101 and the magnetic circuit of core group 102 are used in parallel as in the first embodiment, the flux density of each core varies with change in relative permeability of the core, which may cause increase of loss and magnetic flux saturation. As shown in FIG. 2, core gaps are inserted into all of the cores, whereby variation in relative permeability between cores disposed in parallel can be kept in 10% or less.

When core gaps are inserted, the magnetic resistance of the transformer magnetic circuit increases and the apparent permeability decreases. There is a trade-off relation between variation of magnetizing inductance and loss of the transformer, and the magnetizing inductance of the transformer designed with appropriate core gaps is approximately 1/10 to 1/30 compared with no core gap. Naturally, magnetizing current increases with decrease of magnetizing inductance, but the decrease of magnetizing inductance does not pose a problem in operation or loss of the transformer because the relative permeability of ferrite cores is as significantly large as 2000 to 6000.

Figure 4:
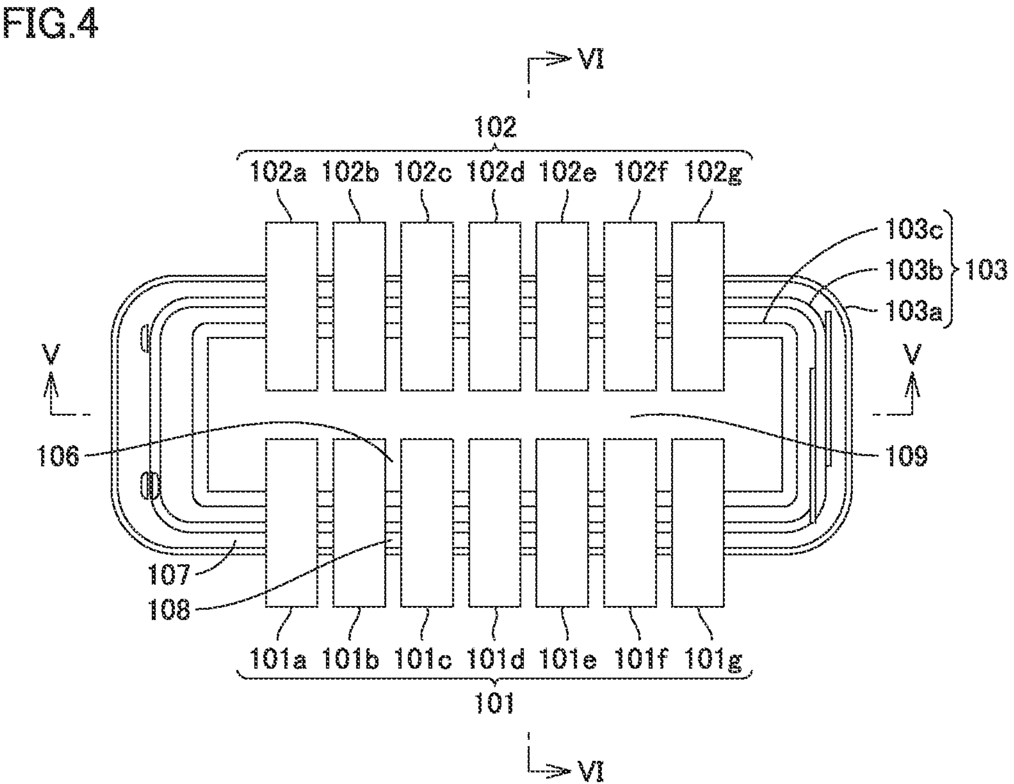
FIG. 4 is a top view showing a configuration of a transformer 100.
Figure 5:
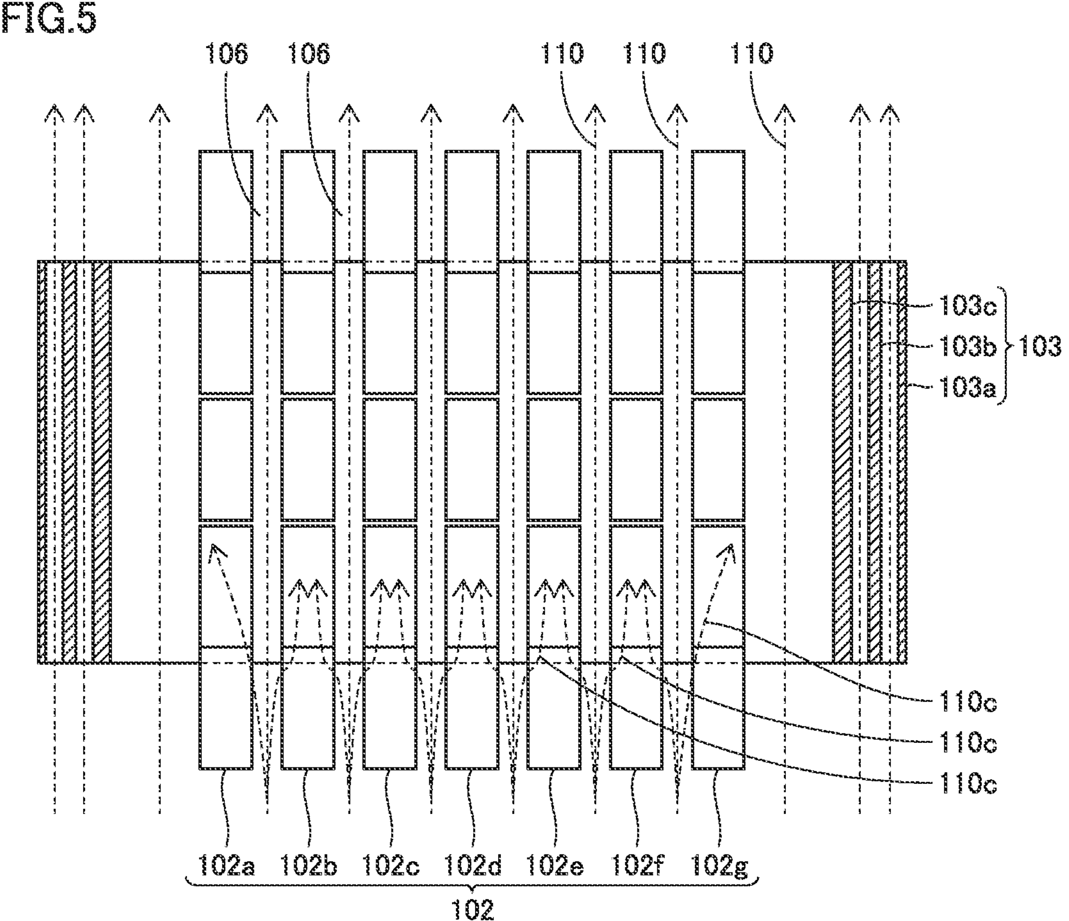
FIG. 5 is a cross-sectional view taken along V-V in FIG. 4.
Figure 6:
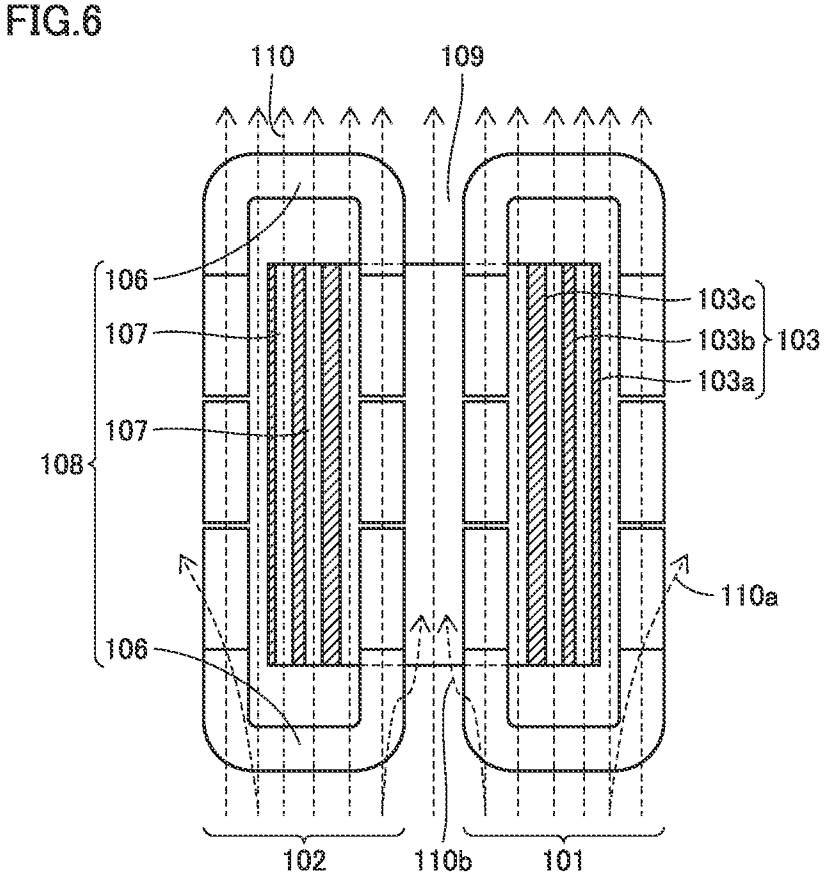
FIG. 6 is a cross-sectional view taken along VI-VI in FIG. 4.

A cooling structure for transformer 100 in the first embodiment will now be described. FIG. 4 is a top view showing a configuration of transformer 100. FIG. 5 is a cross-sectional view taken along V-V in FIG. 4. FIG. 6 is a cross-sectional view taken along VI-VI in FIG. 4.

Cores 101*a* to 101*g* constitute core group 101, and cores 102*a* to 102*g* constitute core group 102.

A core air path 106 is formed in the gap between a core and a core. Since core air path 106 is formed with the surfaces of the cores that face each other, six core air paths are formed with seven cores, and 12 core air paths are formed with 14 cores.

A winding air path 107 is formed in a gap between a winding layer and a winding layer. Since winding air path 107 is formed with the surfaces of the winding layers that face each other, two winding air paths are formed with three winding layers.

Letting a first direction be the length direction of the winding of winding group 103 that constitutes transformer 100, that is, the direction of magnetic flux generated inside of winding group 103, when viewed from the first direction, cores 101*a* to 101*g*, 102*a* to 102*g* and first winding layer 103*a* to third winding layer 103*c* are disposed in a grid pattern, and a number of core winding air paths 108 are formed. When air flows as indicated by broken lines in FIG. 6, the air passes in the order of lower core air path 106, winding air path 107, and upper core air path 106. Furthermore, since core group 101 and core group 102 are disposed with spacing, a ventilation path 109 is formed between the core groups.

Figure 7:
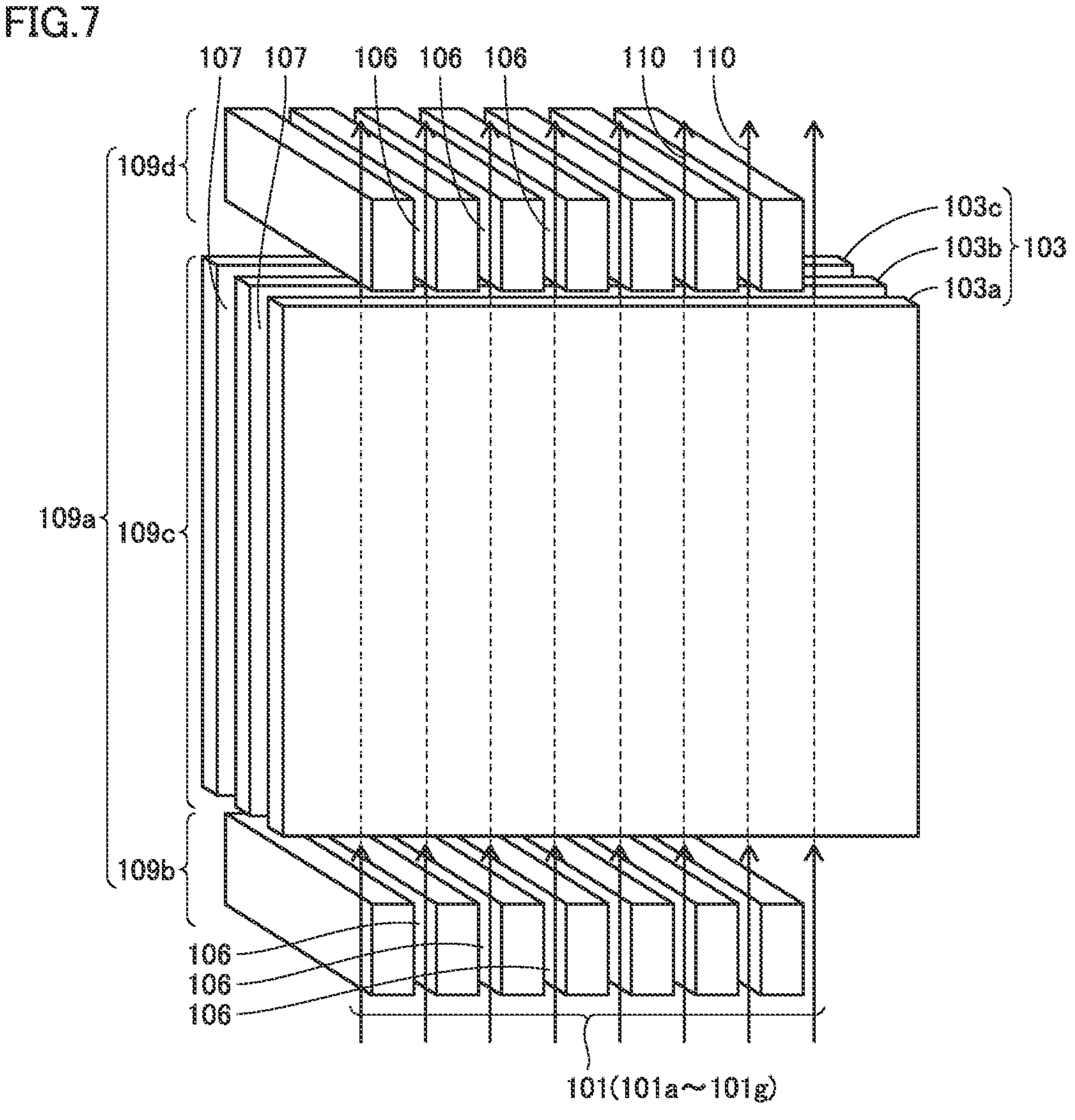
FIG. 7 is a diagram of air path sections formed with a core group 101 and a winding group 103.

FIG. 7 is a diagram of air path sections formed with core group 101 and winding group 103. Referring to FIG. 7, an overview of cooling of the cores and windings of transformer 100 will be described.

The arrows shown by solid lines and broken lines indicate cooling air 110, and the cooling air is supplied from the lower surface of transformer 100 as shown in FIG. 7.

Cooling air 110 flowing from the lower surface initially passes through lower core air paths 106 formed in the gaps of cores 101*a* to 101*g*. This section is referred to as core cooling section 109*b*. Core air path 106 is shaped like a slit in cross section as viewed from the direction in which air flows, and at the same time, the air path length is as short as the width of the magnetic circuit cross section of the core. The pressure loss of core cooling section 109*b* is therefore relatively small.

Cooling air 110 is then led to winding air path 107. Winding air path 107 is also shaped like a slit in cross section as viewed from the direction in which air flows, and cooling air 110 passes through the surfaces of first winding layer 103*a* to third winding layer 103*c*. This section is referred to as winding cooling section 109*c*.

Finally, cooling air 110 passes through upper core air paths 106. This section is referred to as core cooling section 109*d*.

As described above, cooling air 110 passes through core-winding cooling section 109*a* in the order of core cooling section 109*b*, winding cooling section 109*c*, and core cooling section 109*d*. As shown in the drawing, the direction of the slit is changed by 90 degrees every time cooling air 110 passes through each cooling section. Cooling air 110 goes straight without expanding greatly and effectively cools the cores and the windings.

The flow of cooling air will now be described in more detail with reference to FIG. 5 and FIG. 6 again.

The arrowed broken lines in FIG. 5 and FIG. 6 show the flow of cooling air 110. When cooling air 110 is supplied from the lower surface of transformer 100, the cooling air first passes through 12 core air paths 106 formed between the cores. Cooling air 110 includes cooling air 110*a* flowing from the core air path toward the outer periphery of the transformer and cooling air 110*b* flowing toward ventilation path 109 between the core groups.

Cooling air 110*a* flowing from the core air path toward the outer periphery of the transformer is discharged as it is to the outside of transformer 100, whereas cooling air 110*b* flowing toward ventilation path 109 between the core groups contributes to cooling of the core groups in adjacent rows. As described above, since the passage section of core air paths 106 is short, the cooling air flowing out is partial.

The air at the central portion of cooling air 110 passing through core air paths 106 passes through winding air paths 107. In the section of winding air paths 107, the cooling air spreads as cooling air 110*c* flowing in the winding direction of the winding layer shown in FIG. 5, and cooling air 110*c* flowing in the winding direction of the winding layer also intrudes from winding air paths 107 on both sides. Thus, the amount of cooling air 110 flowing to the outside of transformer 100 as cooling air 110*c* is limited. The spreading of the cooling air in the winding direction of the winding layer when the cooling air passes through the inside of winding air path 107 can be easily controlled by a structural member (not shown) holding the winding layers.

It is well known that when heat dissipates from a heating element by heat transfer or heat conduction, the heat transfer coefficient and the thermal conductivity are proportional to the area of the heating element, and the cooling performance improves as the area of the heating element increases. In the first embodiment, most of the surface areas of core groups 101, 102 and winding group 103 as heating elements face the air and can be in contact with cooling air.

As described above, the cooling air flowing from the lower surface of transformer 100 passes through duct-like air paths formed between the cores and between the winding layers. The duct-like air paths are specifically core air paths 106, winding air paths 107, core winding air paths 108 formed with these air paths, and ventilation path 109 between the core groups. Since the cooling air is supplied to most of the surfaces of core groups 101, 102 and winding group 103 having these air paths, the core groups and the winding group can be effectively cooled.

Since ventilation path 109 is provided between the core groups, all of the cores that form magnetic circuits face the air paths, enabling uniform cooling of the cores. Since ferrite cores have a thermal conductivity as poor as 4 to 5 [W/m·K], the cooling performance on the core surface significantly contributes to downsizing of the transformer.

Furthermore, the loss of ferrite cores changes with temperatures. It is common that the ferrite core loss per unit volume is smallest at 80 to 100° C. In other words, ferrite cores have to be used at lower temperatures, compared with the conductor wires of windings and insulating materials used for windings. The improvement in cooling performance of ferrite cores therefore contribute to higher efficiency of the transformer.

The cooling air may be air fed by a blower fan. However, in the configuration having ventilation path 109, effective cooling is possible even by the flow of air produced by natural convection.

In the air cooling by natural convection, the air is less likely to flow in the air paths between cores and between winding layers, due to the viscosity of air and pressure loss. The air path therefore requires a certain width and it is preferable that a width of approximately 10 mm is kept. In the first embodiment, both of core air path 106 and winding air path 107 have a slit shape, and compared with a rectangular duct surrounded in four directions, the pressure loss of air flow can be kept low, the flow rate is high, and the cooling performance is high.

Although an example of the cooling method by a flow of air is illustrated in the first embodiment, similar effects can be achieved by another gas or by immersing the transformer accommodated in a container in an insulating liquid and convecting the gas or liquid.

The configuration of the first embodiment makes the most of the surface area of the cores and windings which are heating components, and therefore, even when the transformer is entirely accommodated in a container and a heat conducive material such as resin and metal is disposed or charged, the thermal resistance between the core and the container or between the winding and the container can be reduced. The cooling performance is therefore improved even by cooling by heat transport to the container through heat conduction.

In the first embodiment, the cores having U-shaped cores facing each other are disposed in two rows to constitute a shell-type transformer. However, a similar magnetic circuit may be formed by arranging E-shaped cores in a row. In this case, ventilation path 109 between the core groups is not formed, and the cores that constitute a core group are long and large, but the number of constituent cores decreases and the fixing of cores can be simplified, thereby improving the ease of assembly.

Figure 8:
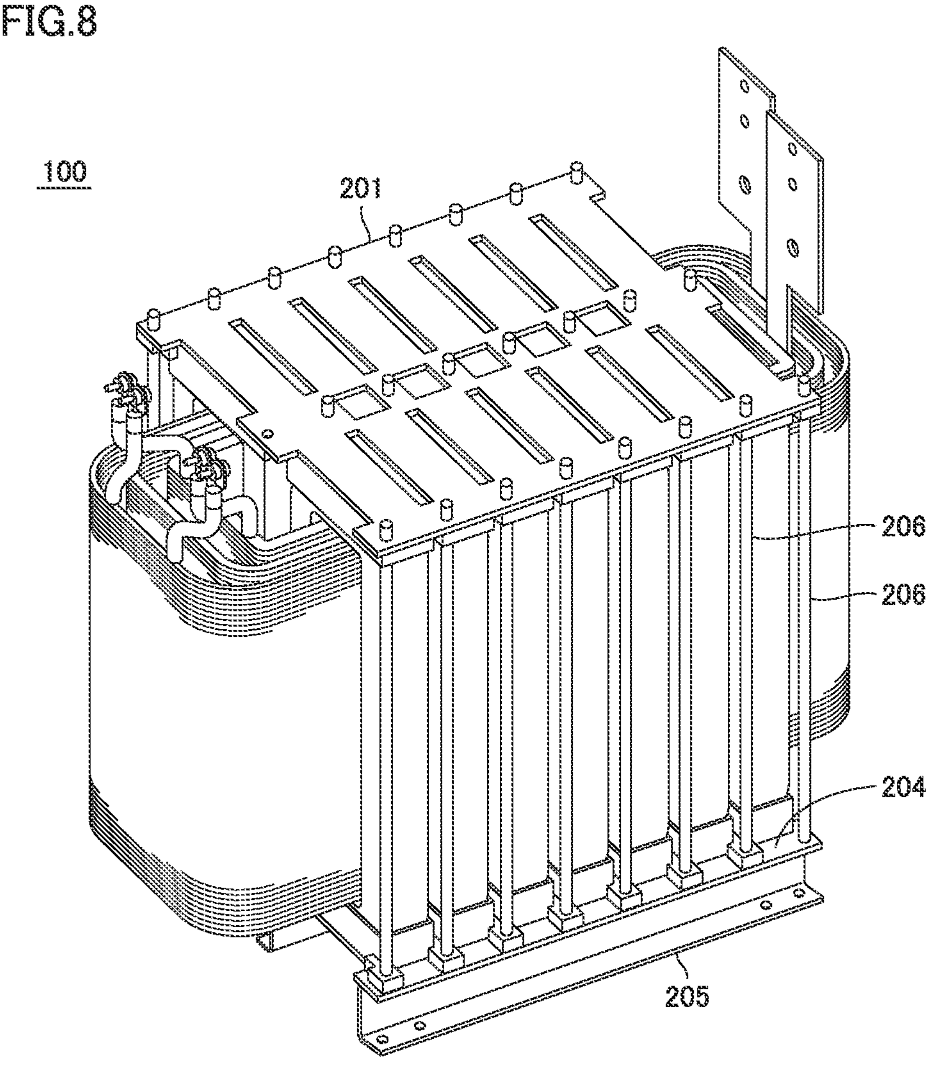
FIG. 8 is a perspective view of the entire structure of transformer 100 in an assembly state.
Figure 9:
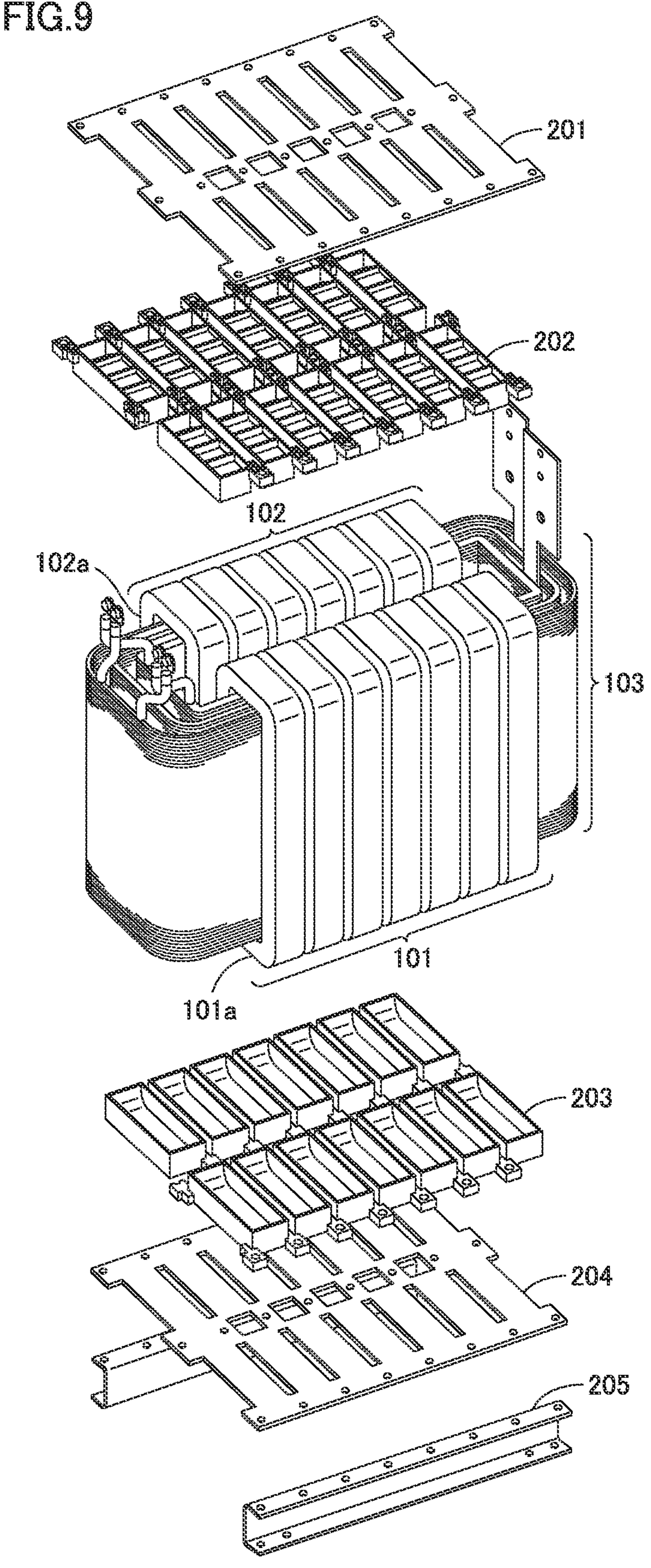
FIG. 9 is an exploded perspective view showing main structural members of transformer 100 for ease of understanding.

A specific assembly structure of transformer 100 in the first embodiment will now be described. FIG. 8 is a perspective view of the entire structure of transformer 100 in an assembly state. FIG. 9 is an exploded perspective view showing main structural members of transformer 100 for ease of understanding.

Core group 101 and core group 102 are held by an upper core holder 202 and a lower core holder 203 such that they are sandwiched from above and below. In this state, the spacing between cores is held by upper core holder 202 and lower core holder 203.

Ferrite cores are often used in high frequency transformers. Since ferrite cores are fired ceramics and fragile, a resin molded product sufficiently strong and more elastic than metal, for example, a molded product of nylon or polyphenylene sulfide (PPS) is used for the material of upper core holder 202 and lower core holder 203.

Large resin molded products also require a large mold, are difficult to ensure accuracy, and involve a high cost. In the first embodiment, therefore, upper core holder 202 and lower core holder 203 are configured such that a plurality of core holder parts 203*a* are arranged, by way of example.

Figure 10:
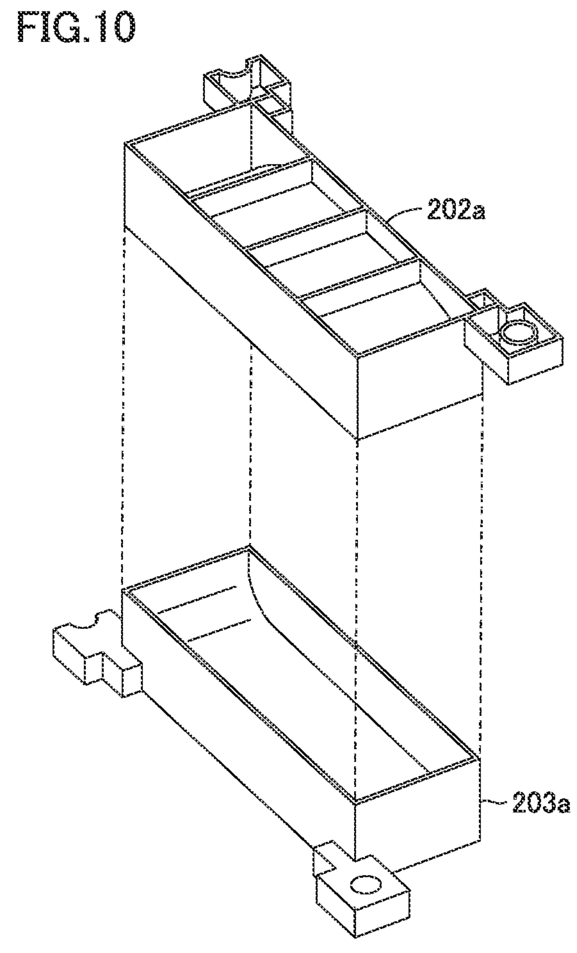
FIG. 10 is a perspective view showing core holder parts.
Figure 11:
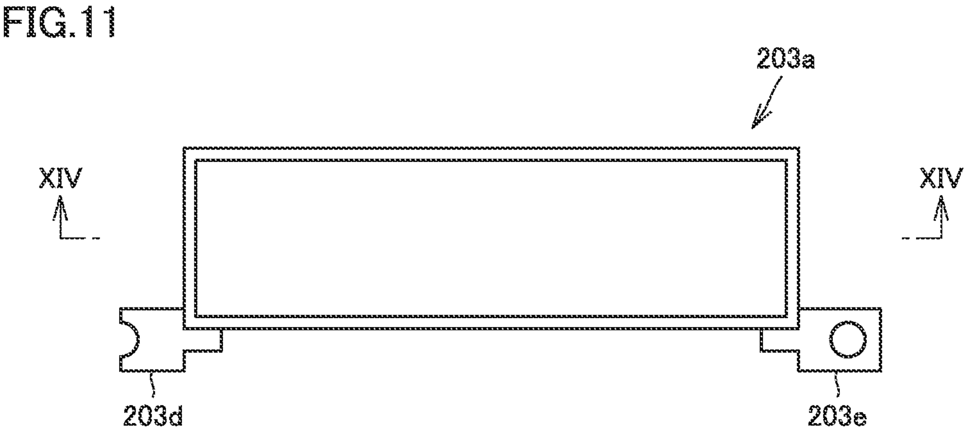
FIG. 11 is a top view of a lower core holder part 203*a*.
Figure 12:
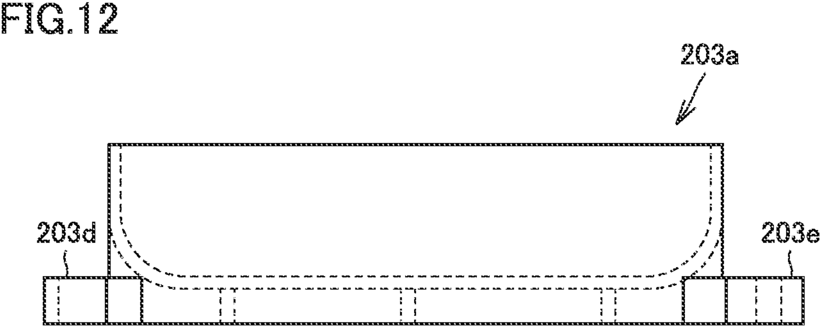
FIG. 12 is a front view of lower core holder part 203*a*.
Figure 13:
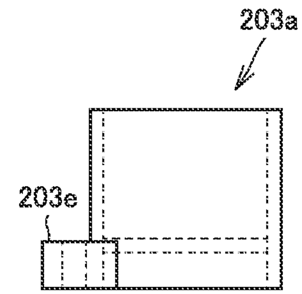
FIG. 13 is a side view of lower core holder part 203*a*.

The detail of upper core holder 202 and lower core holder 203 will be described. FIG. 10 is a perspective view showing core holder parts. FIG. 11 is a top view of a lower core holder part 203*a*. FIG. 12 is a front view of lower core holder part 203*a*. FIG. 13 is a side view of lower core holder part 203*a*.

Core holder parts 202*a* and 203*a* shown in FIG. 10 are used to fix a core. The inner surface of a tray-like bottom portion of core holder part 202*a*, 203*a* has a curvature matched to the shape of the ferrite core. The tray-like bottom portion of core holder part 202*a*, 203*a* is reinforced with ribs in the same mold while being spaced apart from the lower end of core holder part 202*a*, 203*a*. In such a structure, stress exerted on the ferrite core can be alleviated and the vibration resistance of the transformer can be improved.

Core holder part 203*a* generally has a tray-like shape and has a holder base 203*d* and a holder base 203*e* for fixing on the lower portions on both ends of one long side. Holder base 203*e* has a hole for attaching a screw, and holder base 203*d* has a semi-circular notch. Both of holder base 203*e* and holder base 203*d* are formed in a convex shape in a planar view from the first direction.

Figure 14:
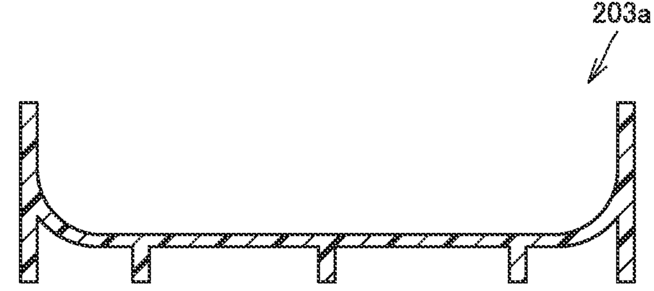
FIG. 14 is a cross-sectional view taken along XIV-XIV of core holder part 203*a* shown in FIG. 11.

FIG. 14 is a cross-sectional view taken along XIV-XIV of core holder part 203*a* shown in FIG. 11. As shown in FIG. 14, the inner surface of the tray-like bottom portion of core holder part 203*a* is formed into a shape having a curvature matched to the shape of the U-shaped ferrite core and stably holds the attached ferrite core with less gap.

The tray-like bottom portion of core holder part 203*a* is reinforced with ribs in the same mold while being spaced apart from the lower end of core holder part 203*a*, so that stress exerted on the ferrite core is alleviated.

Upper core holder part 202*a* and lower core holder part 203*a* can be used in common by turning those of the same shape upside down. A description of upper core holder part 202*a* therefore will not be repeated.

A plurality of core holder parts 202*a* are arranged to form upper core holder 202. A plurality of core holder parts 203*a* are arranged to form lower core holder 203.

Figure 15:
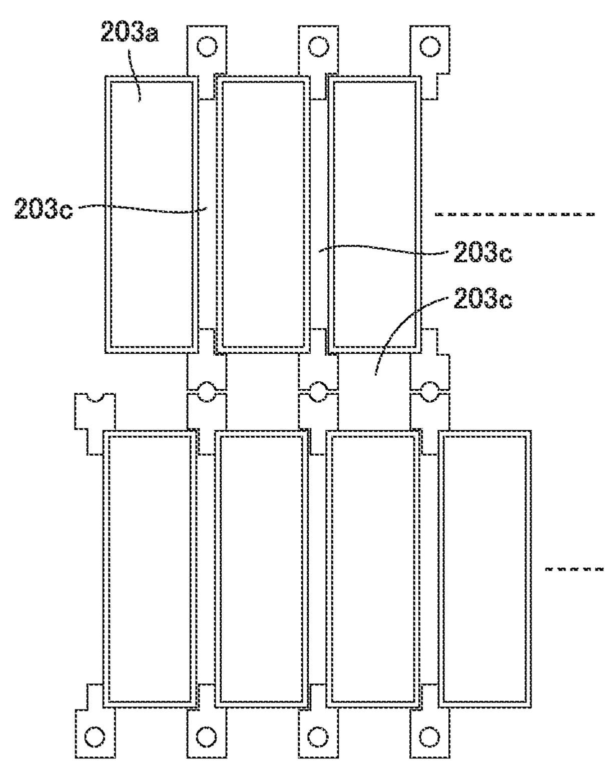
FIG. 15 is a top view showing arrangement of core holder parts 203*a*.

FIG. 15 is a top view showing arrangement of core holder parts 203*a*. A plurality of core holder ventilation paths 203*c* are formed in the core holder parts. Holder base 203*d* and holder base 203*e* of core holder part 203*a* are formed in a convex shape, whereby holes for ventilation to allow the air to flow between cores and between winding layers are formed when core holder parts 203*a* are arranged as lower core holder 203.

A plurality of core holder ventilation paths 203*c* are provided even when upper core holder 202 and lower core holder 203 are each formed as a single unit without using a plurality of core holder parts 202*a*, 203*b*.

As shown in FIG. 9 and FIG. 15, a plurality of core holder parts 202*a*, 203*a* are used to dispose and fix the cores so that the number of cores 101*a* to 101*g*, cores 102*a* to 102*g* in parallel can be changed freely. Thus, even when high frequency transformers with different output capacities are manufactured, there is no need for creating new molds for resin molded products with different shapes. Thus, an optimum magnetic circuit can be formed in accordance with specifications by freely changing the number of common parts, thereby achieving lower costs, short delivery, and downsizing.

Upper core holder 202 and lower core holder 203, which are not mechanically coupled as they are, are arranged and at the same time held and fixed by an upper retaining plate 201 and a lower retaining plate 204, respectively, shown in FIG. 9. Upper retaining plate 201 and lower retaining plate 204 have holes for ventilation to allow the air to flow between cores and between winding layers.

Even non-metal material may be used for upper retaining plate 201 and lower retaining plate 204, such as a processed general purpose resin plate, as long as the material has a mechanical strength.

As shown in FIG. 8, upper retaining plate 201 and lower retaining plate 204 are fastened and fixed by bolts 206 to form the entire structure of transformer 100.

Since a space for ventilation is necessary at the lower section of transformer 100, the lower section of transformer 100 is spaced apart from the installation surface by a lower base 205 to ensure an air intake channel.

In the first embodiment, upper core holder 202 and lower core holder 203 are formed using a plurality of core holder parts 202*a* and 203*b*, respectively. However, when upper core holder 202 and lower core holder 203 are each formed as a single unit, the joining of core holder parts 202*a* and 203*b* becomes unnecessary, and upper retaining plate 201 and lower retaining plate 204 can be eliminated, thereby improving the ease of assembly.

With a configuration as described above, the surface area of the windings and cores is significantly increased, the cooling performance is significantly improved, and downsizing can be achieved, compared with a conventional example in which only a part of the integrated winding and core is cooled.

As shown in FIG. 4 to FIG. 6, core air path 106 is formed in a gap between cores, and winding air path 107 is formed in a gap between winding layers. A plurality of core winding air paths 108 are formed in a grid pattern, in which the air passes alternately through core air paths 106 and winding air paths 107 along the direction in which the air flows. Thus, the cooling surface area of the cores and the cooling surface area of the windings are increased, and ducts of cooling air paths are formed without requiring separate members. Such a configuration improves the core cooling performance and the winding cooling performance and achieves improved reliability because of reduction of members, downsizing, and higher efficiency at the same time.

By disposing a plurality of cores having core gaps in parallel with spacing, the following can be achieved. Loss variations among a plurality of cores are suppressed. The core cooling area can be increased while forming air paths for air cooling, which improves the cooling performance, and thus the transformer can be downsized. In addition, since the disposed cores do not come into contact with each other, the possibility that the cores are rubbed against each other and broken when exposed to vibrations can be avoided, and vibration resistance is improved.

Furthermore, since core group 101 and core group 102 are disposed with a spacing therebetween, ventilation path 109 between the core groups is formed. The air paths for cooling transformer 100 include core air paths 106, winding air paths 107, and core winding air paths 108 formed by these paths, and ventilation path 109 between the core groups. In such a configuration of transformer 100, since all the cores that form magnetic circuits face the air paths, the cores can be cooled uniformly, and downsizing and higher efficiency can be achieved.

For a plurality of winding layers in the windings, cooling air is supplied through the gaps in core group 101 and core group 102. Therefore, the cooling air rectified by the ducts can be fed to the surfaces of all the windings and all the cores, and downsizing and higher efficiency can be achieved.

(Modifications)

In the first embodiment, the cooling mechanism in the transformer alone has been described. However, even more effective cooling can be achieved by adding a duct cooling mechanism that assists in cooling.

Figure 16:
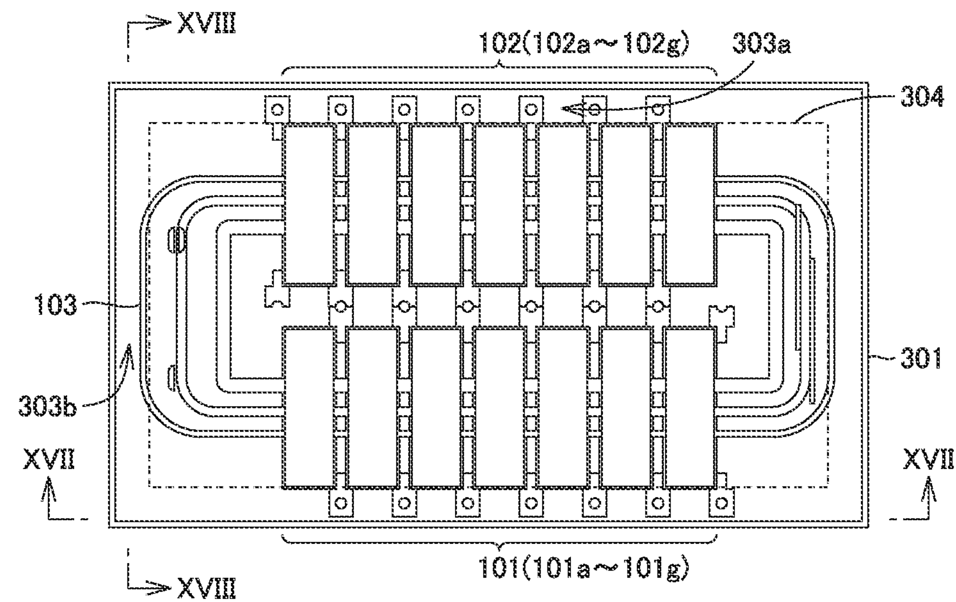
FIG. 16 is a top view of the transformer with a duct cooling mechanism.
Figure 17:
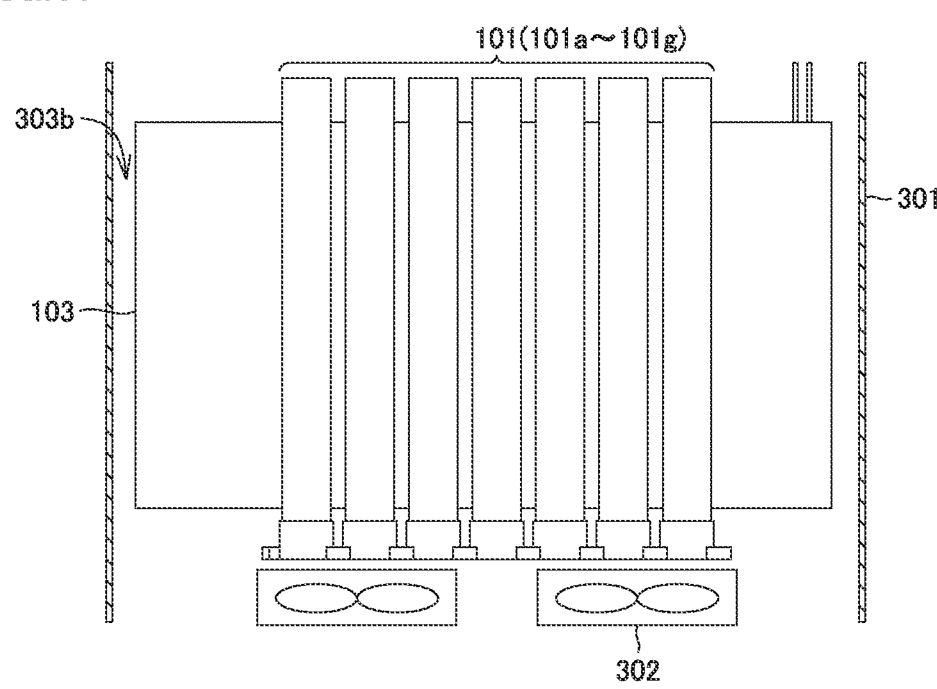
FIG. 17 is a front view of the transformer with the duct cooling mechanism.
Figure 18:
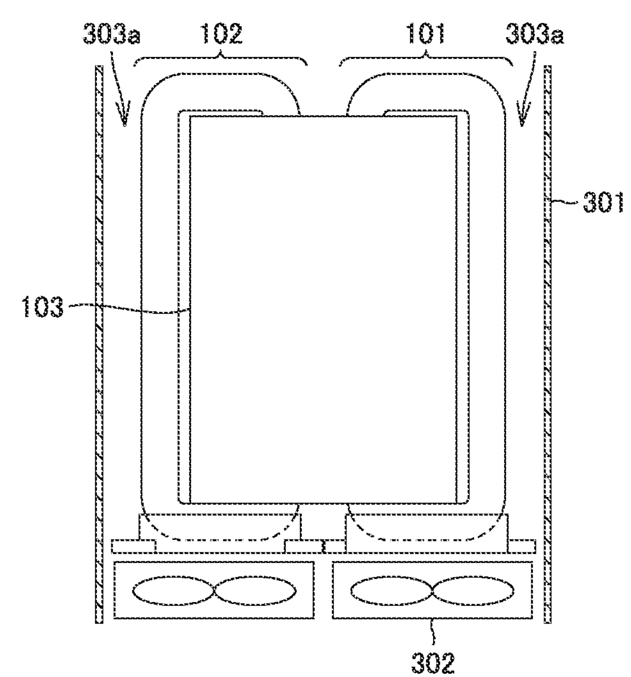
FIG. 18 is a side view of the transformer with the duct cooling mechanism.

FIG. 16 is a top view of the transformer with a duct cooling mechanism. FIG. 17 is a front view of the transformer with the duct cooling mechanism. FIG. 18 is a side view of the transformer with the duct cooling mechanism.

The duct cooling mechanism includes an outer peripheral duct 301 provided around the transformer, and a blower fan 302. A ventilation path is formed between outer peripheral duct 301 and an outer peripheral envelope 304 of the transformer. A ventilation path 303*a* on the core outer periphery is formed between core group 101, 102 and outer peripheral duct 301. A ventilation path 303*b* on the winding outer periphery is formed between winding group 103 and outer peripheral duct 301.

When the outer peripheral duct is not provided, as can be understood from cooling air 110, 110*a* to 110*c* in the side view in FIG. 6, the cooling structure for transformer 100 in the first embodiment cools the transformer structure from the inside, and the cooling performance on the outside denoted by outer peripheral envelope 304 is lower than on the inside.

In a modification shown in FIG. 16 to FIG. 18, ventilation path 303*a* on the core outer periphery is formed by outer peripheral duct 301. Thus, cooling air 110*a* flows through the outside of core group 101 and core group 102 having an uneven shape and a large surface area, so that the cooling performance is further improved compared with the configuration in FIG. 6, and downsizing and higher efficiency can be achieved.

Similar effects can be achieved also in ventilation path 303*b* on the winding outer periphery formed by winding group 103 and outer peripheral duct 301.

Outer peripheral duct 301 having a function of insulating the transformer can be formed using an insulating material such as resin as its material. Outer peripheral duct 301 having a function of shielding the transformer from radiation noise can be formed using a metal material as its material.

As can be understood from FIG. 16, since ventilation path 303*a* on the core outer periphery has a larger effect than ventilation path 303*b* on the winding outer periphery, outer peripheral duct 301 may cover only two faces facing core group 101 and core group 102 rather than covering four faces.

In any case, outer peripheral duct 301 may be provided as a separate member, but a duct may be formed using a part of a device housing that accommodates the transformer.

Furthermore, since the chimney effect is brought about by ventilation path 303*a* on the core outer periphery and ventilation path 303*b* on the winding outer periphery, the cooling performance in natural convection is improved even with a configuration without blower fan 302.

In the first embodiment, an example in which winding group 103 is constituted with a plurality of first winding layer 103*a* to third winding layer 103*c* and each winding layer is a tubular single winding layer has been described. However, the winding layer may be divided into multiple pieces in the vertical direction, for example, in FIG. 17 and FIG. 18. In this configuration, since winding group 103 has a slit-like space, cooling can be performed by an air flow in the direction perpendicular to the direction of a main magnetic circuit, that is, in the traverse direction in FIG. 17 and FIG. 18.

In the first embodiment, an example in which core group 101 and core group 102 are each constituted with seven cores, the core groups are aligned in two rows with spacing from each other, and a total of 14 cores are disposed such that magnetic circuits are in parallel has been described. However, the number and the number of rows of cores in core group 101 and core group 102 may not necessarily be the number described as an example, and similar effects can be achieved as long as a plurality of cores are disposed with spacing to form a core group.

In a core group in which a plurality of cores are disposed with spacing, the number of cores that constitute a core group has an optimum value. The optimum value of the number of cores varies with a core magnetic circuit cross-sectional shape. The relation between the optimum value of the number of cores and the core magnetic circuit cross-sectional shape will be described below.

Figure 23:
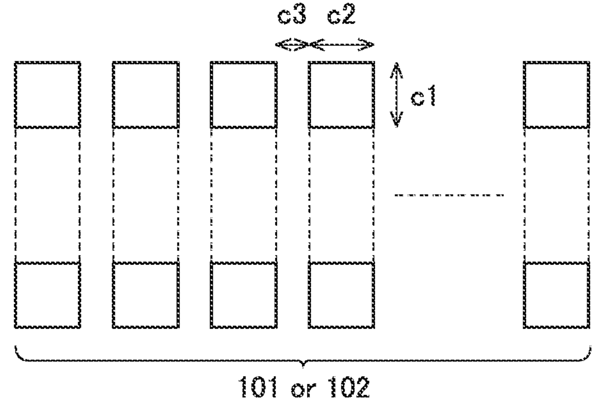
FIG. 23 is a cross-sectional view of core group 101 or 102.

FIG. 23 is a core group cross-sectional view in which the core group is viewed from the first direction. Here, c1 is a core width, c2 is a core thickness, and c3 is the spacing between cores. Since the magnetic circuit cross section of the core is rectangle, the magnetic circuit cross section of the core is represented by the product of the core width c1 and the core thickness c2, and the core surface area of the core side surface is proportional to the sum of the core width c1 and the core thickness c2. In the core group in which a plurality of cores are disposed with spacing, the core surface area increases by corresponding to the core width c1, compared with a core group with zero spacing c3 between cores, that is, a core group that is not constituted with a plurality of cores.

Figures 24, 25:
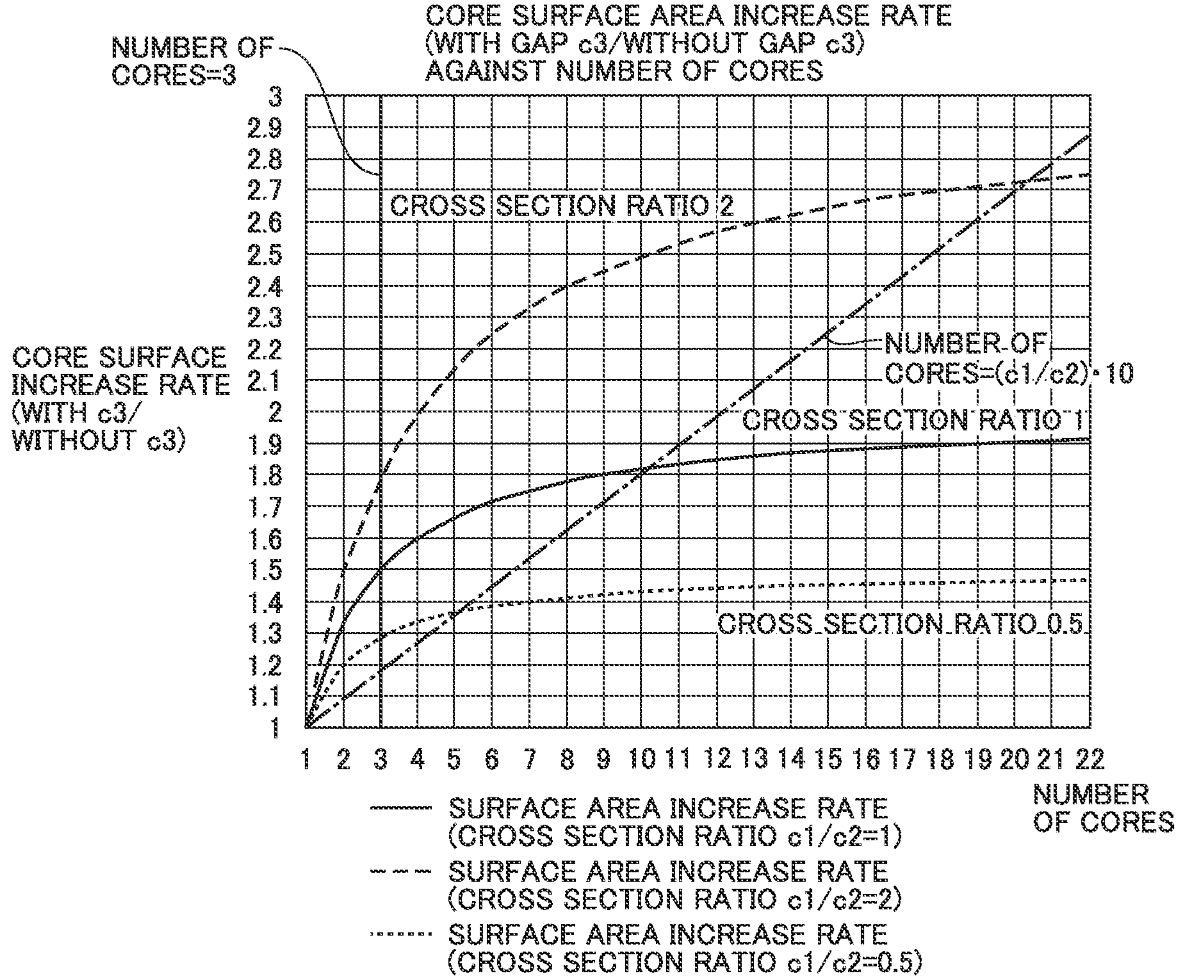
FIG. 24 is a graph showing the relation between the increase rate of core surface area and the number of cores constituting the core group.
FIG. 25 is a cross-sectional view of the core group showing a difference between core groups constituted with cores with different magnetic circuit cross-sectional shapes.

FIG. 24 is a graph showing the relation between the increase rate of core surface area and the number of cores constituting the core group. FIG. 25 is a core group cross-sectional view showing a difference between core groups constituted with cores with different magnetic circuit cross sections.

When a core magnetic circuit cross section ($c1 \times c2$) is constant, the larger the core cross section ratio ($c1/c2$) that is the ratio of the width to the thickness of the magnetic circuit cross-sectional shape of the core, the greater the core surface area increase rate. Further, the increase of the core surface area increase rate continues to a region of a large number of cores. The core surface area increase rate has a maximum value of $(c1+c2)/c2$. The number of cores that reaches 0.9 of the maximum value of the core surface area increase rate is $(c1/c2) \times 9$ and, in a region of the number of cores exceeding this, the increase degree of the core surface area increase rate decreases. In other words, the increase of the core surface area increase rate is large in the region to the left of the dashed-dotted line shown in the graph in FIG. 24. On the other hand, in the present invention, as previously mentioned, effective cooling is achieved by forming spaces in a grid pattern as the arrangement in which the winding layers and the cores are orthogonal to each other. However, when the number of cores is two, the spaces in the grid pattern is only in one row. It is therefore preferable that the number of cores is at least three or more, that is, the spaces in a grid pattern are provided in two or more rows.

Based on the above, the following can be said. When the number of cores is three or more and $(c1/c2) \times 10$ or less, a significant increase of the core surface area is achieved. The larger ($c1/c2$), the wider the selection range of the number of cores that can effectively increase the core surface area.

The magnetic flux passing through the core is concentrated on a magnetic path with a low magnetic resistance, that is, at an annular magnetic circuit, the inside of the magnetic circuit, to cause imbalance in magnetic flux density. As ($c1/c2$) of the core increases, the imbalance in flux density in the core magnetic circuit cross section increases and the cross section use rate of the core decreases.

Judging from the curve in FIG. 24, it is therefore appropriate to set the core cross section ratio ($c1/c2$) to 0.5 to 2.

In the first embodiment, an example in which ferrite cores are used as the cores has been described. However, similar effects can be achieved using other kinds of cores, for example, cores other than ferrite cores, such as silicon steel plates, amorphous cores, nanocrystal cores, and dust cores. In the case of dust cores, the core gaps described in the first embodiment is not necessary because the structure in which insulated magnetic powder is sintered has distribution gaps.

The first embodiment has been described above for the high frequency transformer. Such a transformer is typically embedded in a power conversion device, has the primary winding driven by an AC voltage output by a high frequency inverter to transmit a power to the secondary side, and is used for insulation between the primary side and the secondary side.

In the first embodiment, an example of a high frequency transformer has been described. However, similar effects can be achieved by applying the basic configuration of this structure to a high frequency reactor. In transformer 100 having a sandwich structure in which primary windings are disposed with spacing on both sides of a secondary winding, insulation between the primary winding and the secondary winding is ensured, and while floating capacitance between winding layers is reduced, good electromagnetic coupling is kept. On the other hand, in the case of a high frequency reactor, spacing is provided between winding layers, whereby copper loss due to the proximity effect can be reduced and higher efficiency can be achieved, in addition to ensuring insulation and reducing floating capacitance.

An example of the circuit operation of a power conversion device using transformer 100 in the first embodiment will now be described.

FIG. 19 is a circuit diagram of a power conversion device in the first embodiment. FIG. 19 illustrates a circuit example of a DC-DC conversion circuit for use in an auxiliary power source device for railway vehicles, as a typical example.

A power conversion device 500 includes an input terminal 501, a smoothing capacitor 502, a high frequency inverter 503, a transformer 100, a control circuit 504, a secondary-side rectifying circuit 505, a smoothing reactor 506, a secondary-side smoothing capacitor 507, a photocoupler 508, a secondary voltage current detecting circuit 509, and an output terminal 510.

A DC voltage Vi is applied as an input voltage between the +Vi terminal and the −Vi terminal of input terminal 501. The input DC voltage Vi is charged as it is to the primary-side smoothing capacitor 502, whereby a primary smooth voltage Vc smoothed and stabilized is generated.

Primary-side smooth voltage Vc is supplied to inverter 503. Inverter 503 is composed of primary MOSFETs (metal-oxide-semiconductor field effect transistors) 503*a* to 503*d* connected in full bridge.

Figure 20:
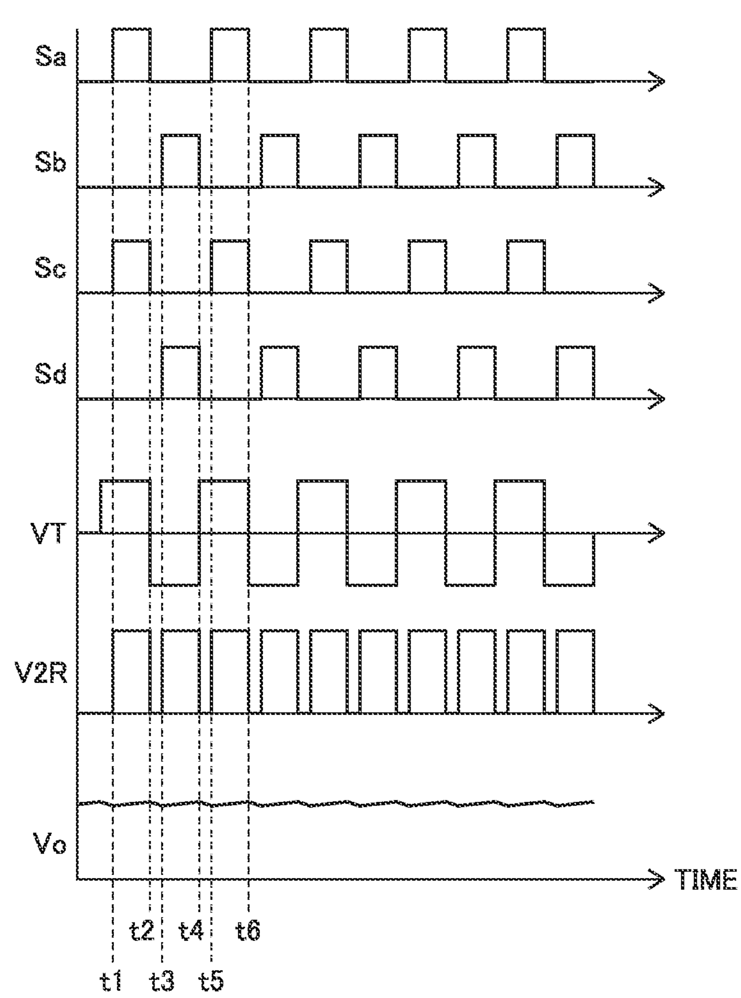
FIG. 20 is an operation timing chart of a circuit connection example in FIG. 19.

FIG. 20 is an operation timing chart of the circuit connection example in FIG. 19.

Control circuit 504 generates ON control signals Sa to Sd for primary MOSFETs 503*a* to 503*d* at timings shown in FIG. 20.

Primary MOSFETs 503*a* to 503*d* are switched in response to ON control signals Sa to Sd in order at times t1 to t6 in FIG. 20. Thus, primary smooth voltage Vc is applied as a primary voltage VT to transformer 100.

As a result, primary voltage VT of transformer 100 is alternating current having a rectangular wave as shown in FIG. 20. Primary voltage VT of transformer 100 is not completely in phase with ON control signals Sa to Sd because of back electromotive force by magnetizing energy.

The secondary voltage of transformer 100 is full-wave rectified by rectifying circuit 505. Rectifying circuit 505 is composed of secondary rectifying diodes 505*a* to 505*d*. The output voltage of rectifying circuit 505 has a secondary full-wave rectified waveform V2R. Secondary full-wave rectified waveform V2R is smoothed by smoothing reactor 506 and secondary-side smoothing capacitor 507, and consequently, an output voltage Vo is output to output terminal 510.

Secondary voltage current detecting circuit 509 detects output voltage Vo and output current Io and transmits a feedback signal to control circuit 504 through photocoupler 508.

Control circuit 504 controls the pulse width of ON control signals Sa to Sd, based on a feedback signal transmitted from secondary voltage current detecting circuit 509, and adjusts output voltage Vo and output current Io to appropriate values.

In such power conversion device 500 operating at high frequencies, since the loss in inverter 503, transformer 100, and smoothing reactor 506 is usually large and takes up 80 to 90% of the entire loss, these components have a great influence on the efficiency of the power conversion device.

Among the components of the power conversion device, transformer 100 and smoothing reactor 506 are large in shape and heavy in weight and therefore a major factor for size increase and cost increase of power conversion device 500. When the transformer in the first embodiment or the smoothing reactor with a cooling structure based on this is driven by a high frequency inverter, the shape per ferrite core that constitutes the core is compact. Thus, the sensitivity of characteristic change for firing in manufacturing of ferrite cores is suppressed, and iron loss at high frequencies can be reduced.

Furthermore, since the core cooling performance is good and temperature increase can be suppressed, iron loss can be reduced.

Furthermore, since the winding layer keeps the distance between windings, the proximity effect between windings and the skin effect of the windings are reduced, and in addition, the floating capacitance between winding layers can be reduced and copper loss at high frequencies can be reduced.

As a result, higher efficiency, downsizing, weight reduction, and cost reduction of the power conversion device can be achieved by using the coil device in the first embodiment.

In the first embodiment, an example of the insulation-type full-bridge converter under pulse width modulation (PWM) control has been described. However, the control scheme is not limited to PWM control and may be other schemes such as phase control. The circuit scheme also may be other circuit schemes, and the applied voltage is not limited to a rectangular wave and may be a sinusoidal wave to achieve similar effects.

An example in which the switching elements used in inverter 503 is MOSFETs has been described, but any other kinds of power semiconductors such as insulated gate bipolar transistors (IGBTs) may be used.

In the first embodiment, an example in which the power conversion device is a DC-DC conversion device has been described, but the power conversion device may be a DC-AC conversion device that outputs a high-frequency AC voltage if rectifying circuit 505, smoothing reactor 506, smoothing capacitor 507, and the like are removed from the configuration in FIG. 19.

The output power of the power conversion device in the first embodiment is presumed to be mainly 10 kW to 1000 kW. The applications of the DC-DC conversion device include chargers for electric cars, auxiliary power source devices for railway vehicles, and power conversion devices for DC transmission. The applications of the DC-AC conversion device that outputs a high-frequency AC voltage include induction heating devices, wireless charging systems, and power sources for laser processing machines. In this way, the coil device and the power conversion device described in the first embodiment find a wide variety of applications.

In natural air cooling, a high cooling effect can be achieved at 10 kW or higher, whereas in other cooling methods such as forced air cooling, even the applications at less than 10 kW can take advantage of the characteristics of the coil device in the first embodiment.

Second Embodiment

Figure 21:
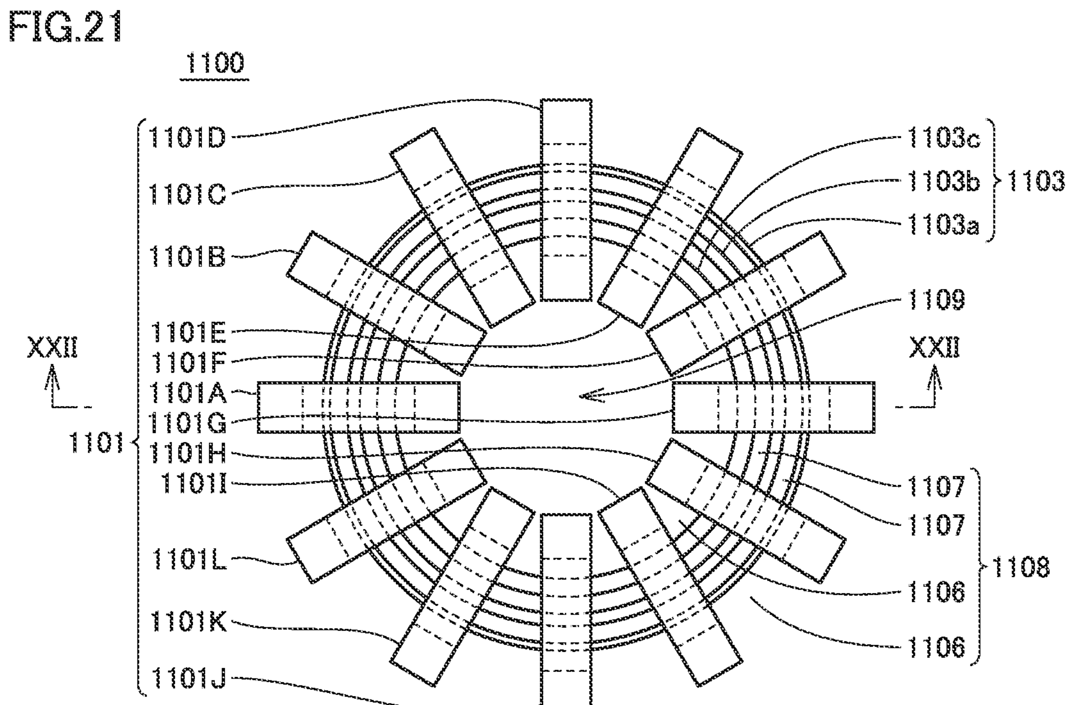
FIG. 21 is a top view showing a configuration of a transformer 1100 which is an example of a coil device according to a second embodiment.

FIG. 21 is a top view showing a configuration of a transformer 1100 which is an example of a coil device according to a second embodiment. In the second embodiment, the coil device is a high frequency transformer as in the first embodiment. The configuration of transformer 1100 according to the second embodiment and transformer 100 according to the first embodiment have common parts, and differences from the configuration shown in FIG. 4 and FIG. 6 will be described and a description of details will not be repeated.

Transformer 1100 includes a core group 1101 and a winding group 1103. Winding group 1103 includes a first winding layer 1103*a*, a second winding layer 1103*b*, and a third winding layer 1103*c*. Transformer 1100 has a basic configuration similar to that of transformer 100 described in the first embodiment except that the number and arrangement of cores and the shape of winding layers are different.

Core group 1101 includes 12 cores 1101A to 1101L each having a closed magnetic circuit. When the length direction of the winding of winding group 1103, that is, the direction of magnetic flux produced inside of winding group 1103 is the first direction, cores 1101A to 1101L are radially spaced apart from each other as viewed from the first direction.

Each of cores 1101A to 1101L has a plurality of core gaps 101*xc* shown in FIG. 3 in the same manner as in the first embodiment.

A core air path 1106 is formed in a gap between a core and a core in the same manner as in the first embodiment. Since core air path 1106 is formed with the surfaces of the adjacent cores that face each other, 12 core air paths are formed with 12 cores.

A winding air path 1107 is formed in a gap between a winding layer and a winding layer. Since winding air path 1107 is formed with the surfaces of the winding layers that face each other, two winding air paths are formed with three winding layers 1103*a* to 1103*c*.

In other words, a number of core winding air paths 1108 are formed in a sector grid pattern, in which air passes alternately through core air paths 1106 and winding air paths 1107, in the same manner as in the first embodiment.

Since core group 1101 is radially arranged and winding groups 1103 are circularly disposed, the shape of the transformer is generally circular and a ventilation path 1109 between core groups is formed at the center, which is a difference from the first embodiment.

Figure 22:
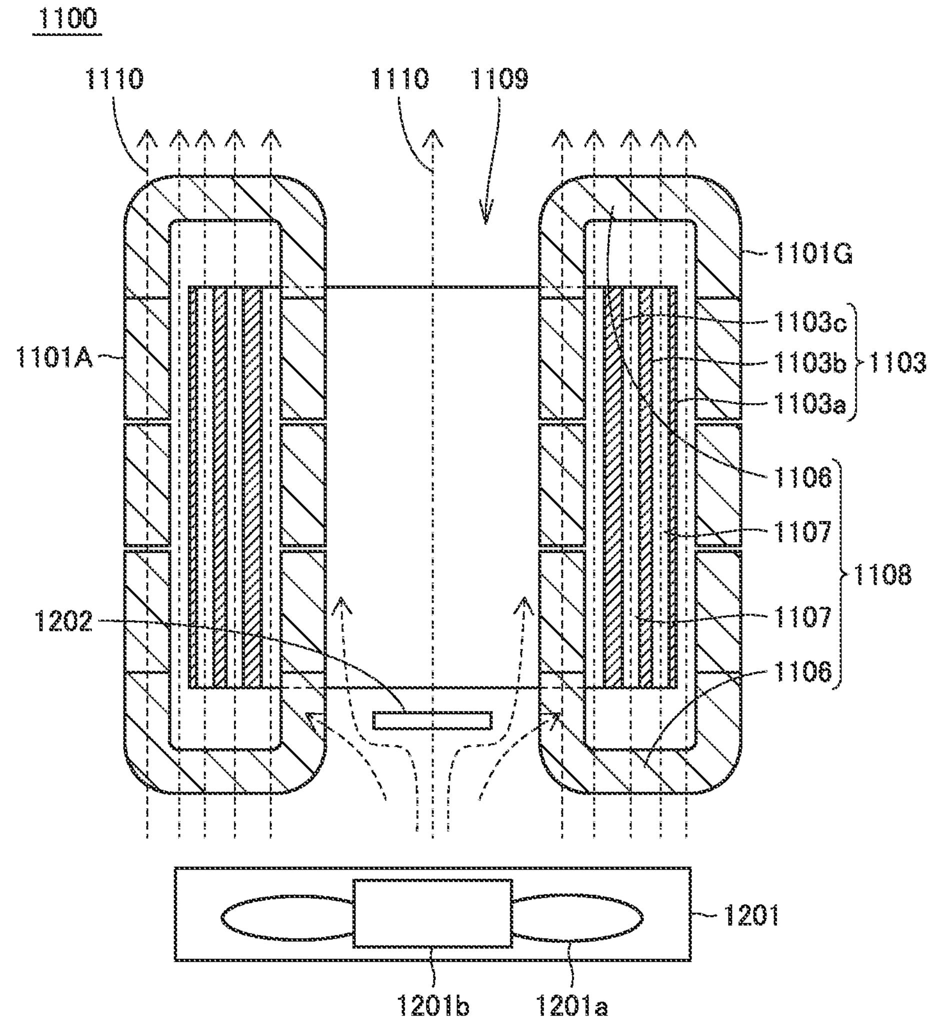
FIG. 22 is a cross-sectional view taken along XXII-XXII of the transformer shown in FIG. 21.

FIG. 22 is a cross-sectional view taken along XXII-XXII of the transformer shown in FIG. 21.

Cooling air 1110 depicted by arrowed broken lines effectively cools the entire transformer, in the same manner as in the first embodiment. However, unlike the first embodiment, the area of ventilation path 1109 between core groups is an area greater than a certain value, because the cores are unable to be freely brought closer by the arrangement of cores.

A blower fan 1201 is placed at the lower part of the transformer to feed cooling air 1110. Blower fan 1201 is a common propeller fan including a fan blade 1201*a* and a fan motor 1201*b* to rotate fan blade 1201*a*.

As described above, since core group 1101 is radially arranged and winding groups 1103 are circularly disposed and wound, the winding requires the minimum length. This can reduce copper loss and achieve downsizing and higher efficiency of the transformer.

Since almost no winding group 1103 is exposed on the outside of core group 1101, radiation noise from the windings is suppressed, a separate shielding member is unnecessary, and low noise and downsizing of the transformer can be achieved.

The shape of the transformer is generally circular, the temperature distribution in the transformer is uniform, and higher efficiency of the transformer can be achieved.

A typical propeller fan is characterized in that air is not blown from fan motor 1201*b* and air is blown from fan blade 1201*a* because the fan motor is disposed at the center.

On the other hand, since the cores are unable to be brought closer by the arrangement of cores, the area of ventilation path 1109 between core groups is an area larger than a certain value and the pressure loss in air blowing is small, whereas the gap of winding air path 1107 is narrow with a large pressure loss. This fits the characteristics of blower fan 1201 described above, enabling extremely effective cooling and leading to downsizing of the transformer.

Since the shape of transformer 1100 is generally circular, it is only necessary to arrange one propeller fan at the center to provide uniform cooling, leading to downsizing of the transformer.

As shown in FIG. 22, a rectifying member 1202 may be disposed, if necessary, in ventilation path 1109 between core groups to control the flow paths of cooling air 1110 and perform more appropriate cooling. Rectifying member 1202 is particularly effective in the second embodiment in which the cross section of ventilation path 1109 between core groups is large, but it is also effective even in the first embodiment if the cross section of ventilation path 109 between core groups is large.

In the second embodiment, the improvement of cooling performance using the outer peripheral duct and the cooling method other than cooling air described in the first embodiment can be employed.

SUMMARY

The foregoing first and second embodiments have been summed up with reference to the drawings.

The present disclosure relates to a coil device. As shown in FIG. 1, transformer 100 which is an embodiment of the coil device includes core groups 101, 102 including a plurality of cores 101*a* to 101*g*, 102*a* to 102*g* forming a plurality of closed magnetic circuits, and winding group 103 including a plurality of winding layers 103*a* to 103*c* formed by winding conductor wires into a tubular shape. Each of winding layers 103*a* to 103*c* penetrates through the closed magnetic circuits formed by the cores 101*a* to 101*g*, 102*a* to 102*g*. As shown in FIG. 4, cores 101*a* to 101*g*, 102*a* to 102*g* are disposed side by side with spacing along the conductor wires through which current of winding layers 103*a* to 103*c* flows when viewed from the first direction (top view). Winding layers 103*a* to 103*c* are disposed side by side with spacing along a direction intersecting the direction of current when viewed from the first direction (top view). Preferably, winding layers 103*a* to 103*c* and cores 101*a* to 101*g*, 102*a* to 102*g* include sections arranged in a grid pattern when viewed from the first direction (top view).

With a configuration as described above, since magnetic circuits are formed by a plurality of cores, loss can be suppressed and higher efficiency can be achieved. Furthermore, the surface area of cores is increased by disposing a plurality of cores in parallel with spacing. Thus, the surface area of cores can be fully utilized for cooling. Thus, the cooling performance in air cooling is improved, and downsizing and higher efficiency of the coil device can be achieved.

Furthermore, since a plurality of winding layers are disposed with spacing, the insulation properties are improved. Since a plurality of winding layers are disposed with spacing, the floating capacitance is reduced and the efficiency is improved.

The surface area of winding layers is increased by disposing the winding layers with spacing from each other. The surface area of winding layers can be fully utilized for cooling as a heat dissipation surface. Thus, the cooling performance in air cooling is improved, and downsizing can be achieved. In addition, temperature increase is alleviated and the loss can be reduced.

In addition, spaces in a grid pattern are formed as the arrangement in which winding layers and cores are orthogonal to each other, and the winding layers and the cores form ventilation paths and ducts. In this way, air paths to allow cooling air to flow are formed when forced air cooling or natural air cooling is performed. At the same time, since the constituent members of the air paths are cores and winding layers, the cores and winding layers can be cooled effectively without using separate members, leading to downsizing of the coil device.

A space between winding layers and a space between winding layer and core are provided by forming spaces in a grid pattern as the arrangement in which winding layers and cores are orthogonal to each other. Thus, the insulation properties of the coil device are improved. As a result, a manufacturing step such as potting becomes unnecessary, the heat dissipation performance is improved, and the reliability is improved.

Since a manufacturing step such as potting is eliminated, an insulating member with a high permittivity is not interposed, thereby reducing floating capacitance and improving the efficiency of the coil device.

Preferably, as shown in FIG. 3, each of cores 101*a* to 101*g*, 102*a* to 102*g* includes a plurality of core pieces 101*xa*, 101*xb* forming a corresponding closed magnetic circuit. In each of cores 101*a* to 101*g*, 102*a* to 102*g*, gap 101*xc* is provided at at least one section between core pieces disposed along the magnetic flux direction.

In such a configuration, since a plurality of cores are constituted with a plurality of core pieces, loss can be suppressed and higher efficiency of the coil device can be achieved.

Since each of a plurality of cores includes a magnetic gap for a magnetic circuit, an imbalance of magnetic flux among the cores can be suppressed when magnetic circuits of the cores are used in parallel. This eliminates the need for increasing the allowance for variations of loss and magnetic saturation and leads to downsizing of the coil device.

Preferably, as shown in FIG. 4, the core group includes first core group 101 and second core group 102 each constituted with a plurality of cores. When viewed from the first direction (top view), first core group 101 and second core group 102 are arranged in parallel with spacing from each other. Cores 101*a* to 101*g*, 102*a* to 102*g* include sections aligned on a straight line with spacing when viewed from the first direction (top view). In FIG. 4, cores 101*a* to 101*g*, 102*a* to 102*g* are disposed in a matrix of seven rows and two columns.

In such a configuration, the rows of core groups are disposed with spacing therebetween so that an air duct is formed between the rows of the core groups, thereby reducing members for cooling ducts and improving the cooling performance at the same time.

Preferably, as shown in FIG. 21, a plurality of cores 1101A to 1101L are radially spaced apart from each other when viewed from the first direction (top view). When viewed from the first direction, the outer peripheral envelope of cores 1101A to 1101L is circular. When viewed from the first direction, ventilation path 1109 between core groups is provided at the center of cores 1101A to 1101L. When viewed from the first direction (top view), a plurality of winding layers 1103*a* to 1103*c* are each annular and disposed with spacing from the center toward the outer peripheral envelope.

In a configuration as shown in FIG. 21, since almost no windings are exposed to the outside of the core group, radiation noise from the windings is suppressed, a separate shielding member is unnecessary, and low noise and downsizing can be achieved.

Furthermore, the shape is generally circular, the temperature distribution of the coil device becomes uniform, and higher efficiency of the coil device can be achieved.

In addition, since a plurality of cores and a plurality of winding layers are disposed radially and concentrically with spacing to form a sector grid pattern when viewed from the first direction, the core group and the winding groups form cooling ducts, thereby reducing members for cooling ducts and improving the cooling performance at the same time.

Furthermore, since the outer peripheral shape is circular for the ventilation paths, cooling air with less variations can be fed by one propeller fan, thereby improving the cooling performance.

Preferably, as shown in FIG. 16, transformer 100 further includes outer peripheral duct 301 surrounding a part or the whole of the outside of outer peripheral envelope 304 of cores 101*a* to 101*g*, 102*a* to 102*g*. Ventilation paths 303*a*, 303*b* are provided between the outer peripheral envelope and the duct.

In this way, ventilation paths 303*a*, 303*b* are formed on the core outer periphery by outer peripheral duct 301 on the outer periphery, whereby the cooling air essentially flows through the outside of core groups 101, 102 with an uneven shape and a large surface area, thereby achieving downsizing and higher efficiency of the coil device.

Furthermore, ventilation path 303*b* on the winding outer periphery is formed between winding group 103 and outer peripheral duct 301, whereby the cooling air flows along the winding layer outer periphery, thereby improving the cooling performance and achieving downsizing and higher efficiency of the coil device.

In another aspect, the present disclosure relates to a power conversion device. As shown in FIG. 19, power conversion device 500 includes inverter 503 to convert a DC voltage (Vi) into a high-frequency AC voltage (VT), transformer 520 to receive high-frequency AC voltage (VT) at the primary-side input from inverter 503, and control circuit 504 to perform pulse width control of inverter 503. Transformer 520 includes transformer 100 (or 1100) according to any one of the above.

In this way, transformer 520 with excellent cooling performance, less iron loss, less copper loss, compact size, and high efficiency is driven by inverter 503, whereby downsizing and higher efficiency of power conversion device 500 can be achieved.

In yet another aspect of the present disclosure, power conversion device 500 includes inverter 503 to convert a DC voltage (Vi) into a high-frequency AC voltage (VT), transformer 520 to receive high-frequency AC voltage (VT) at the primary-side input from inverter 503, control circuit 504 to perform pulse width control of inverter 503, rectifying circuit 505 to rectify a voltage on the secondary-side output of transformer 520, and smoothing reactor 506 and smoothing capacitor 507 to smooth an output voltage of rectifying circuit 505. Each of transformer 520 and smoothing reactor 506 includes transformer 100 (or 1100) according to any one of the above.

In this way, the transformer with excellent cooling performance, less iron loss, less copper loss, compact size, and higher efficiency is driven by a high frequency inverter, and the smoothing reactor with excellent cooling performance, less iron loss, less copper loss, compact size, and higher efficiency is used for smoothing a high-frequency voltage, whereby downsizing and higher efficiency of the power conversion device can be achieved.

It is initially intended that the embodiments disclosed herein are carried in combination without causing contradiction. Embodiments disclosed here should be understood as being illustrative rather than being limitative in all respects. The scope of the present disclosure is shown not in the foregoing description of embodiments but in the claims, and it is intended that all modifications that come within the meaning and range of equivalence to the claims are embraced here.

REFERENCE SIGNS LIST

100, 520, 1100 transformer, 101, 102, 1101 core group, 101*a* to 101*g*, 101*x*, 102*a* to 102*g*, 1101A to 1101L core, 101*xa*, 101*xb* core piece, 101*xc* core gap, 103, 1103 winding group, 103*a* to 103*c*, 1103*a* to 1103*c* winding layer, 104 primary input terminal, 105 secondary output terminal, 106, 1106 core air path, 107, 1107 winding air path, 108, 1108 core winding air path, 109, 303*a*, 303*b*, 1109 ventilation path, 109*a*, 109*c* winding cooling section, 109*b*, 109*d* core cooling section, 110, 110*a*, 110*b*, 110*c*, 1110 cooling air, 201 upper retaining plate, 202 upper core holder, 202*a*, 203*a*, 203*b* core holder part, 203 lower core holder, 203*c* core holder ventilation path, 203*d*, 203*e* holder base, 204 lower retaining plate, 205 lower base, 206 bolt, 301 outer peripheral duct, 302, 1201 blower fan, 304 outer peripheral envelope, 500 power conversion device, 501 input terminal, 502, 507 smoothing capacitor, 503 inverter, 503*a* to 503*d* MOSFET, 504 control circuit, 505 rectifying circuit, 505*a* to 505*d* rectifying diode, 506 smoothing reactor, 508 photocoupler, 509 secondary voltage current detecting circuit, 510 output terminal, 1201*a* fan blade, 1201*b* fan motor, 1202 rectifying member.

The invention claimed is:

1. A coil device comprising:

a core group including a plurality of cores forming a plurality of closed magnetic circuits; and a winding group including a plurality of winding layers formed by winding conductor wires into a tubular shape, wherein each of the winding layers penetrates through the closed magnetic circuits, when viewed from a first direction, the cores are disposed side by side with spacing along the conductor wires through which current flows, the cores include a first core and a second core disposed adjacent to the first core, a core air path is formed in a gap between the first core and the second core, when viewed from the first direction, the winding layers are disposed side by side with spacing along a direction intersecting a direction of the current, the winding layers include a first winding layer and a second winding layer disposed adjacent to the first winding layer, a winding air path is formed in a gap between the first winding layer and the second winding layer, the core group includes a first core group and a second core group each constituted with the cores, and the first core group and the second core group are adjacent to each other, when viewed from the first direction, the first core group and the second core group are arranged in parallel with spacing from each other, an inter-core-group ventilation path is formed in a gap between the first core group and the second core group adjacent to the first core group, and the core air path communicates with the inter-core-group ventilation surface.

2. The coil device according to claim 1, wherein the winding group and the core group are arranged to form an air path between an end face, in the direction intersecting the direction of the current, of the winding group, and a surface, opposed to the end face, of each of the cores.

3. The coil device according to claim 1, wherein the winding layers and the cores include sections arranged to form a grid pattern when viewed from the first direction.

4. The coil device according to claim 1, wherein each of the cores includes a plurality of core pieces disposed annularly to form a corresponding closed magnetic circuit, and in each of the cores, a gap is provided at at least one section between the core pieces disposed along a magnetic flux direction.

5. The coil device according to claim 1, wherein each of the cores is held, at both ends with respect to the first direction, by a retainer including an upper retaining plate and a lower retaining plate, and the retainer has a through section as viewed from the first direction.

6. The coil device according to claim 5, wherein the upper retaining plate and the lower retaining plate are fastened and fixed by a bolt extending in the first direction.

7. The coil device according to claim 1, wherein each of the cores is held by a retainer at at least both ends with respect to the first direction, and the retainer has a through section at a position overlapping the core air path and an inter-core-group ventilation path as viewed from the first direction.

8. The coil device according to claim 7, wherein the retainer is formed by arranging a plurality of retainer units.

9. The coil device according to claim 8, wherein the retainer includes an upper retaining plate and a lower retaining plate that hold and fix the retainer units, and the upper retaining plate and the lower retaining plate each has a through section at a position overlapping the core air path and the inter-core-group ventilation path as viewed from the first direction.

10. The coil device according to claim 1, wherein when a core magnetic circuit cross-sectional shape of the cores that constitute the first core group or the second core group is quadrangle, where, of two sides that constitute a core magnetic circuit cross section, a length of a side in a direction perpendicular to the winding layer is a core width, a length of a side parallel to the winding layer is a core thickness, and core width/core thickness is a core cross section ratio, the number of cores that constitute the first core group or the second core group is three or more and core cross section ratio×10 or less.

11. The coil device according to claim 10, wherein the core cross section ratio is 0.5 to 2.

12. The coil device according to claim 1, further comprising a duct surrounding a part or whole of outside of an outer peripheral envelope of the cores and the winding layers, wherein a ventilation path is provided between the cores and the duct, and between the winding layers and the duct.

13. A power conversion device comprising:

an inverter to convert a DC voltage into a high-frequency AC voltage;

a transformer to receive the high-frequency AC voltage at a primary-side input from the inverter; and a control circuit to perform pulse width control of the inverter, wherein the transformer includes the coil device according to claim 1.

14. A power conversion device comprising:

an inverter to convert a DC voltage into a high-frequency AC voltage;

a transformer to receive the high-frequency AC voltage at a primary-side input from the inverter;

a control circuit to perform pulse width control of the inverter;

a rectifying circuit to rectify a voltage of a secondary-side output of the transformer; and a smoothing reactor and a secondary-side smoothing capacitor to smooth an output voltage of the rectifying circuit, wherein each of the transformer and the smoothing reactor includes the coil device according to claim 1.

15. The coil device according to claim 1, wherein the core air path and the winding air path are slit-shaped paths intersecting each other as viewed from the first direction.

16. A coil device comprising:

a core group including a plurality of cores forming a plurality of closed magnetic circuits; and a winding group including a plurality of winding layers formed by winding conductor wires into a tubular shape, wherein each of the winding layers penetrates through the closed magnetic circuits, when viewed from a first direction, the cores are disposed side by side with spacing along the conductor wires through which current flows, when viewed from the first direction, the winding layers are disposed side by side with spacing along a direction intersecting a direction of the current, the core group includes a first core group and a second core group each constituted with the cores and, when viewed from the first direction, the first core group and the second core group are arranged in parallel with spacing from each other, and a first space in spacing between a first core of the first core group and a second core of the first core group adjacent to the first core and a second space in spacing between a third core of the second core group and a fourth core of the second core group adjacent to the third core communicate with a third space in spacing between the first core and the third core, opposed to the first core, of the second core group, and a fourth space in spacing between the second core and the fourth core, opposed to the second core, of the second core group.

17. The coil device according to claim 16, wherein the first space and the second space form a core air path, and the third space and the fourth space form a part of an inter-core-group ventilation path.

* * * * *